United States Patent
Yoshikawa et al.

(10) Patent No.: US 7,545,053 B2
(45) Date of Patent: Jun. 9, 2009

(54) POWER SUPPLY AND POWER SUPPLY METHOD UPON INTERRUPTION OF ELECTRIC SERVICE

(75) Inventors: Toshifumi Yoshikawa, Tokyo (JP); Yasuo Satou, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/524,777

(22) PCT Filed: Sep. 4, 2002

(86) PCT No.: PCT/JP02/08971

§ 371 (c)(1),
(2), (4) Date: Feb. 16, 2005

(87) PCT Pub. No.: WO2004/023625

PCT Pub. Date: Mar. 18, 2004

(65) Prior Publication Data

US 2005/0231869 A1 Oct. 20, 2005

(51) Int. Cl.
H02J 3/38 (2006.01)

(52) U.S. Cl. .................................. 307/19; 700/295

(58) Field of Classification Search ............. 307/29, 307/18, 64, 85, 43, 19, 20; 324/522; 702/57; 700/295, 286

See application file for complete search history.

(56) References Cited

U.S. PATENT DOCUMENTS

| | | | | |
|---|---|---|---|---|
| 6,097,108 A * | 8/2000 | Tweed | ........................... | 307/31 |
| 6,177,738 B1 * | 1/2001 | Hentunen et al. | ............. | 307/67 |
| 6,181,028 B1 * | 1/2001 | Kern et al. | ..................... | 307/64 |
| 6,194,794 B1 * | 2/2001 | Lampe et al. | ................. | 307/68 |
| 6,304,005 B1 * | 10/2001 | Aoki et al. | ..................... | 307/64 |
| 6,404,075 B1 * | 6/2002 | Potter et al. | .................... | 307/64 |
| 6,465,910 B2 * | 10/2002 | Young et al. | ................... | 307/64 |
| 6,757,590 B2 * | 6/2004 | Ross et al. | ................... | 700/286 |
| 6,849,967 B2 * | 2/2005 | Lathrop et al. | ................ | 307/64 |
| 2002/0014802 A1* | 2/2002 | Cratty | .......................... | 307/43 |
| 2002/0084697 A1* | 7/2002 | Radusewicz | ................. | 307/64 |
| 2002/0190576 A1* | 12/2002 | Kern et al. | ..................... | 307/18 |
| 2003/0042794 A1* | 3/2003 | Jarrett, Jr. | ..................... | 307/23 |
| 2004/0066094 A1* | 4/2004 | Suzuki et al. | .................. | 307/18 |

FOREIGN PATENT DOCUMENTS

| | | |
|---|---|---|
| JP | 9-121457 | 5/1997 |
| JP | 2000-308280 | 11/2000 |
| JP | 2002-10499 | 1/2002 |
| JP | 2002-10500 | 1/2002 |
| JP | 2002-17055 | 1/2002 |
| JP | 2002-27670 | 1/2002 |
| JP | 2002-34162 | 1/2002 |

* cited by examiner

*Primary Examiner*—Albert W Paladini
*Assistant Examiner*—Daniel Cavallari
(74) *Attorney, Agent, or Firm*—Crowell & Moring LLP

(57) ABSTRACT

A power supply system includes a power line for supplying power from a distributed power source to a load upon interruption of electric service from a power system, the load being supplied with power from the power system at normal times; a first switch for connecting the load with the power system at normal times and disconnecting them upon interruption of electric service; and a second switch for connecting the load with the power line upon interruption of electric service and disconnecting them at normal times. Thus, upon interruption of the service, it is possible to use the distributed power source and stably supply power to the load.

2 Claims, 17 Drawing Sheets

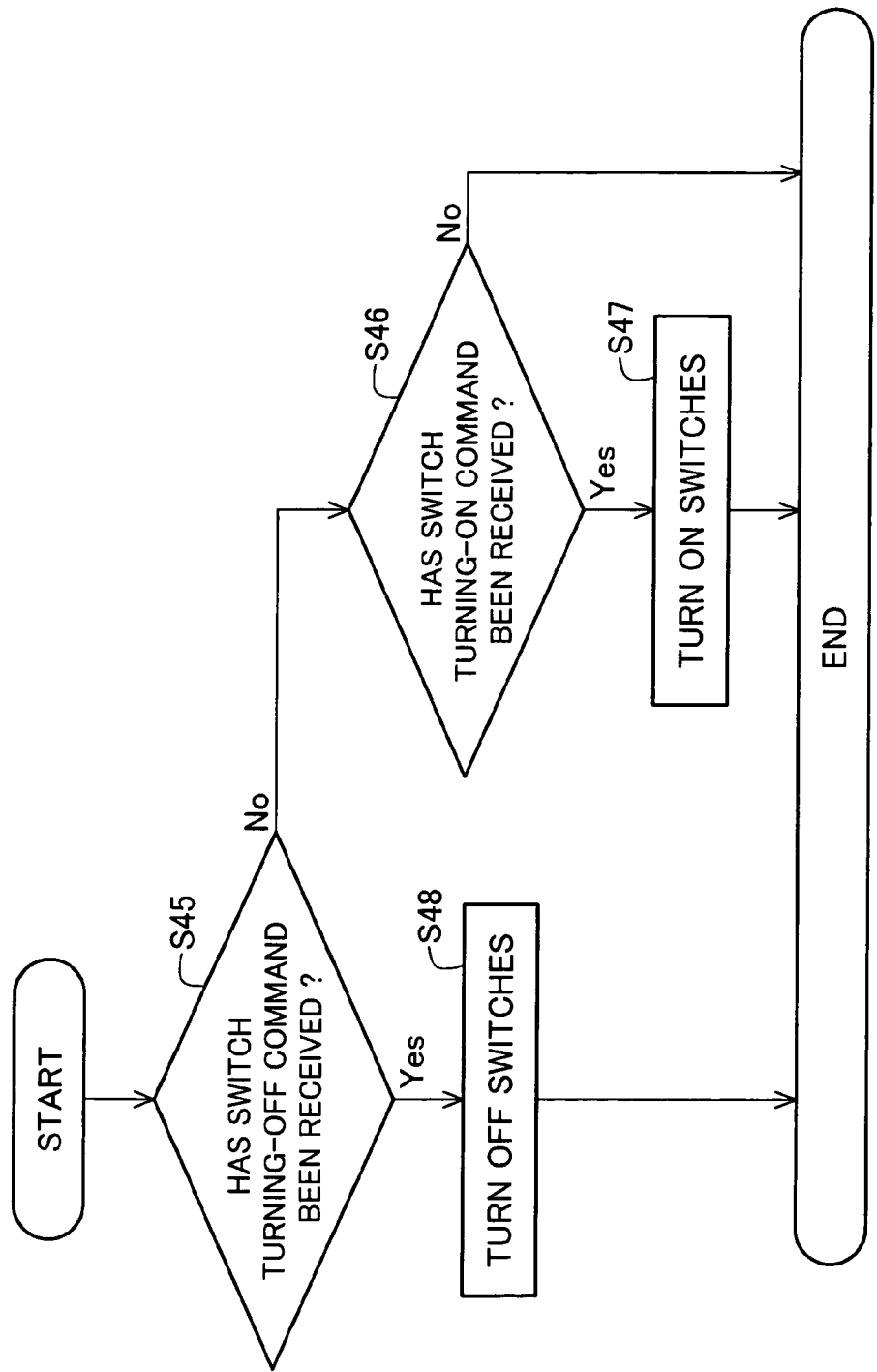

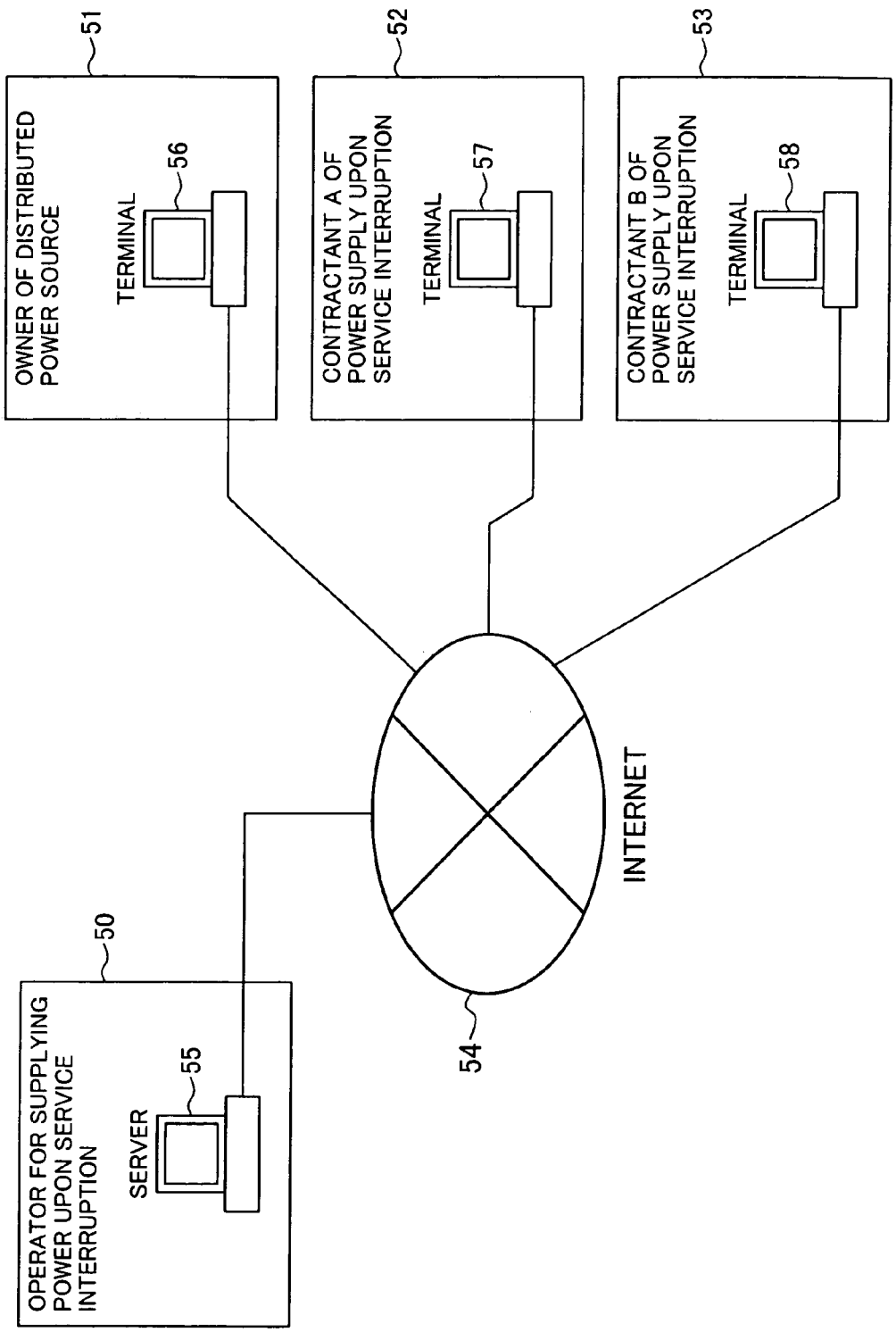

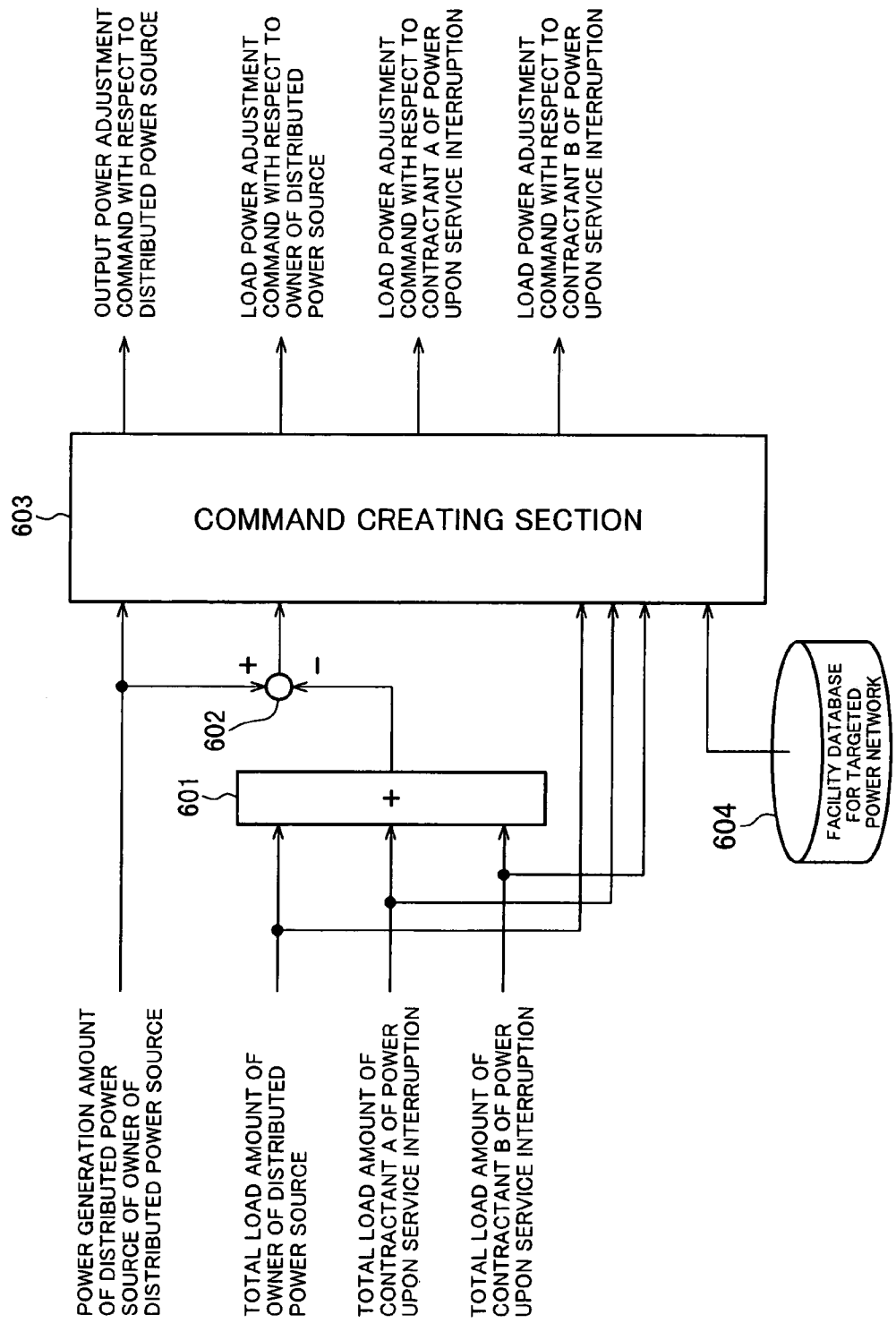

POWER SUPPLY AND POWER SUPPLY METHOD UPON INTERRUPTION OF ELECTRIC SERVICE

TECHNICAL FIELD

The present invention relates to a power supply system using a distributed power source, and a power supply method upon interruption of electric service.

BACKGROUND ART

As an example of a conventional art using a distributed power source, such as fuel cells, a solar power generation system, or the like, upon interruption of electric service, there has been known a technique disclosed in JP,A 9-121457. According to this patent document, once a large-scale interruption of electric service has been caused by, for example, a fall-down of an electric power pylon for a high-voltage trunk transmission line, a control center commands and controls distributed power sources to supply power so that the total of a suppliable electric energy from the distributed power sources becomes equal to an unsuppliable electric energy. On the other hand, as facilities for supplying power only during interruption of the service, batteries (principally lead storage batteries) are used for emergency power generators or emergency power sources in hospitals, large-scale buildings, and the like.

If the deregulation of electric power industry moves forward into the future, cost competition would suppress the capital investment in power stations, power transmission/transformation facilities, and the like, resulting in shortages of the amounts of power generation and transmission. This would incur a situation in which a stable power supply becomes unattainable. For example, as in the California power crisis, which caused a serious trouble in 2001, periodical and long-term interruptions of electric service might occur.

However, utilizing a distributed power source using the conventional art as countermeasures against a long-term service interruption occurring under such a situation includes the following problems.

Firstly, the guideline on power supply from a distributed power source is not well-defined, so that there is no other choice but to supply power to an indefinite number of loads. However, because the power generation capacity of the distributed power source is small, power can be supplied to only loads within a limited range. Therefore, it cannot be known until an interruption of electric service actually occurs, to which loads power can be supplied. This is a very risky situation when seen from the load side (power demand side).

Secondly, within a power supply network with a distributed power source, power supply/demand balance controlling means consists of only the control of the power generation output of the distributed power source and the opening/closing of loads, that is, there is provided only limited balance control means. As a result, if the supply/demand of power gets out of balance even to a minimum extent, loads are to be shut off one after another. This is also a very unstable situation when seen from the load side (power demand side).

Thirdly, many of distributed power sources to be introduced in the future are considered to be owned not by electric utilities (power providers), but by private companies. In this case, an electric utility cannot take the liberty of manipulating a power source owned by a private company. However, it is difficult for the owner itself of a private power source to execute the control of power supply/demand balance in place of the electric utility.

Also, the battery, serving as an emergency power generator or emergency power source, is intended to supply power to private facilities upon interruption of electric service, and does not supply power to a load other than the private facilities. This has a problem that a load without an emergency power generator cannot receive a power supply upon interruption of the service.

DISCLOSURE OF INVENTION

It is an object of the present invention to stably supply power to a load by using a distributed power source upon interruption of electric service.

In a power supply system according to the present invention, upon interruption of electric service from a power system, a load is disconnected from the power system, and a power line for supplying power to be outputted from a distributed power source is connected to the load. In order to disconnect and connect the load relative to the power system and power line, respective switches are provided. According to this power supply system, since a power line for supplying power to a specified load upon interruption of the service can be connected therewith, it is possible to supply power to a load commensurate with the output power of the distributed power source upon interruption of the service. Thus, upon interruption of the service, power of the distributed power source can be stably supplied to the load.

In a power supply system and a power supply method according to another aspect of the present invention, during interruption of the service, when power is supplied from a distributed power source to a plurality of loads, one or both of the power consumption of the plurality of loads and the power generation amount of the distributed power source are controlled so that they get close to each other. For this purpose, in this power supply system, there are provided controllers for adjusting the power consumption of the plurality of loads and controllers for adjusting the power generation amount of the distributed power source. According to the present power supply system and power supply method, the power consumption of the plurality of loads and the power generation amount of the distributed power source can be brought into balance. Thus, during interruption of the service, it is possible to stably supply power of the distributed power source to the plurality of loads.

Other features of the present invention will become clear from the following descriptions and drawings.

BRIEF DESCRIPTION OF THE DRAWINGS

FIG. 12 is a flowchart showing an example of a handling process of switch controllers with respect to the power supply system with the distributed power source.

FIG. 15 is a diagram showing an example of a communication network configuration with respect to the power supply system with the distributed power source.

FIG. 16 is a block diagram showing an example of a power supply/demand balance control upon service interruption with respect to the power supply system with the distributed power source.

BEST MODE FOR CARRYING OUT THE INVENTION

Figure 1:
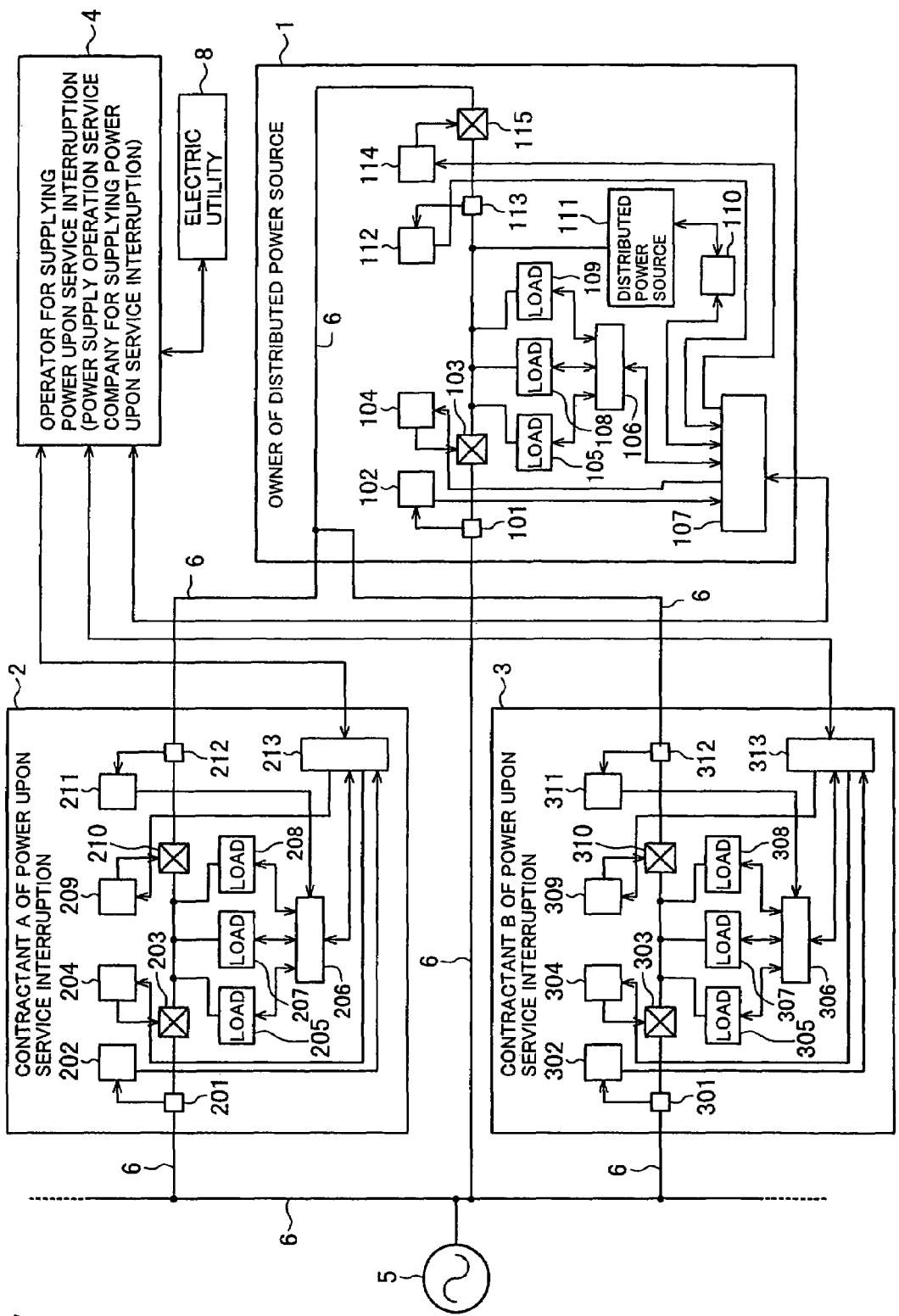
FIG. 1 shows a power supply system with a distributed power source according to an embodiment of the present invention.

FIG. 1 shows a power supply system according to an embodiment of the present invention. Main components of the power supply system comprise system facilities 1 (including loads and a distributed power source) of an owner of distributed power source, system facilities 2 of a contractant A of power upon service interruption; system facilities 3 of contractant B of power upon service interruption, a power system 5, and an operator 4 for supplying power upon service interruption. The following are details of each of these components.

At normal times, power is supplied from the power system 5 of an electric utility (power provider), through a power line 6, to the system facilities 2 of the contractant A of power upon service interruption, the system facilities 3 of the contractant B of power upon service interruption, and the system facilities 1 of the owner of distributed power source. Here, the system facilities 1 of the owner of distributed power source include a distributed power source 111, and when power of the distributed power source is being sold to the electric utility, the power partially flows in the opposite direction.

The operator 4 for supplying power upon service interruption (power supply operation service company for supplying power upon service interruption) performs the formation of a local power supply network comprising a distributed power source, serving as a power supply source upon service interruption, and a specified load (or specified loads), as well as the operator 4 conducts the management and operation of the local power supply network. Specifically, in the case of a planned service interruption, the operator 4 issues a command signal before the service interruption, while, in the case of an accidental service interruption, it issues a command signal after the service interruption, thereby performing the formation of a local power supply network by the opening/closing changeover of a switch, and the control of balance between the power supply amount of the distributed power source and the power consumption of loads within the network.

The system facilities 1 of the owner of distributed power source include loads 105, 108, and 109 in this system facilities, and the distributed power source 111. Moreover, as facilities for forming a local power supply network upon service interruption, the system facilities 1 include a switch controller 104 and a switch 103 for connecting and disconnecting the above-described loads and the distributed power source relative to the power system of the electric utility; a power line 6 for supplying power upon service interruption from the distributed power source 111 to the load side of the contractant of power upon service interruption, i.e., the power demand side; a switch controller 114 and a switch 115 for connecting and disconnecting the power line 6 relative to the distributed power source 111; a power source output controller 110 for controlling the output of the distributed power source 111; a load power controller 106 for controlling the power consumption of the loads 105, 108, and 109; a relay device 107 for exchanging information with the operator 4 for supplying power upon service interruption; a current sensor 113 and a power value calculator 112 for detecting the power supply amount from the system facilities 1 of the owner of distributed power source; and a voltage sensor 101 and a service interruption determining device 102 for detecting an occurrence of a service interruption.

To the distributed power source 111, the following is applicable: a micro gas turbine, a fuel cell battery, a NAS battery, a secondary battery such as a lead battery, an aerogenerator, a solar power generation system using solar cells, a small-scale hydroelectric generator, a diesel engine generator, a gas engine generator, a biomass generator, or the like.

The system facilities 2 of the contractant A of power upon service interruption include loads 205, 207, and 208 in this system facilities. Moreover, as facilities for forming a local power supply network upon service interruption, the system facilities 2 include a switch controller 204 and a switch 203 for connecting and disconnecting the above-described loads and the distributed power source relative to the power system of the electric utility; a power line 6 for supplying power upon service interruption from the distributed power source 111 to the loads 205, 207, and 208; a switch controller 209 and a switch 210 for connecting and disconnecting the power line 6 relative to these loads; a load power controller 206 for controlling the power consumption of the loads 205, 207, and 208; a relay device 213 for exchanging information with the operator 4 for supplying power upon service interruption; a current sensor 212 and a power value calculator 211 for detecting the total load power of the system facilities 2 of the contractant A of power upon service interruption; and a voltage sensor 201 and a service interruption determining device 202 for detecting an occurrence of a service interruption.

As in the case of the contractant A of power upon service interruption, the system facilities 3 of the contractant B of power upon service interruption include loads 305, 307, and 308 in this system facilities; a switch controller 304 and a switch 303; a power line 6; a switch controller 309 and a switch 310; a load power controller 306 for controlling the power consumption of the loads 305, 307, and 308; a relay device 313 for exchanging information with the operator 4 for supplying power upon service interruption; a current sensor 312 and a power value calculator 311 for detecting the total load power of the system facilities 3; and a voltage sensor 301 and a service interruption determining device 302 for detecting an occurrence of a service interruption.

Next, operations of the power supply system shown in FIG. 1 will be described with regard to operations at normal times (i.e., the case where there is no service interruption), those at the time of a planned service interruption (i.e., the case where an occurrence of a service interruption has been forecasted), and those at the time of an unplanned service interruption (i.e., the case of an accidental service interruption).

(A) At Normal Times

At normal times, power is supplied from the power system 5, through the power line 6, to the system facilities 2 of the contractant A of power upon service interruption, the system facilities 3 of the contractant B of power upon service interruption, and the system facilities 1 of the owner of distributed power source. In this case, the power flows from the power system side to the load side. However, when power of the distributed power source 111 of the system facilities 1 of the owner of distributed power source is being sold to the electric utility (or the power provider), the power partially flows in the opposite direction.

(B) At Time of Planned Service Interruption

Figure 9:
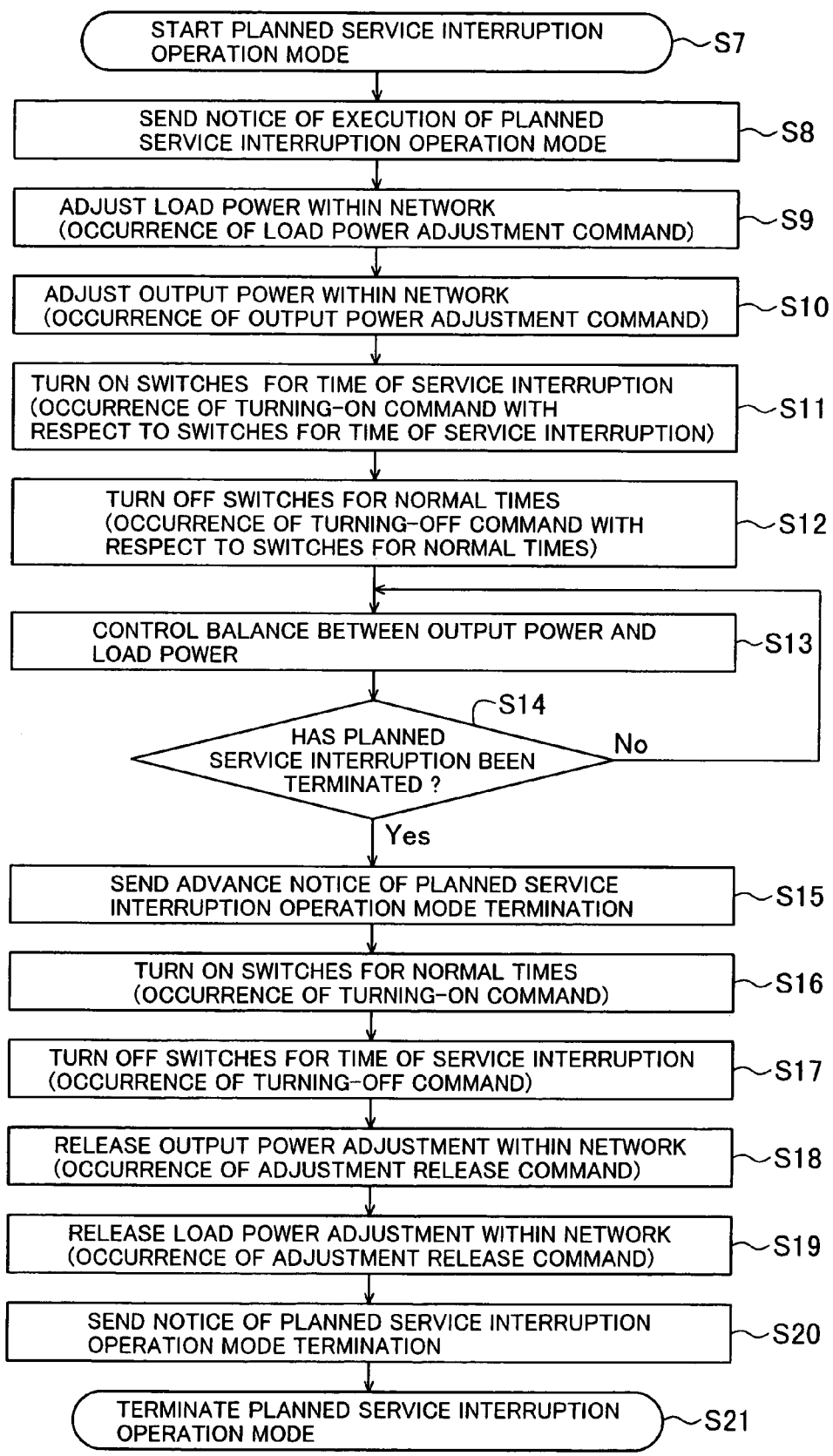
FIG. 9 is a flowchart showing an example of a handling process for determining an operation mode with respect to a planned service interruption in the power supply system with the distributed power source.

FIG. 9 is a flowchart showing processing of the power supply system with a distributed power source at the time of a planned service interruption. Hereinafter, description is made while correlating the flow of the system processing in FIG. 9 with the system configuration in FIG. 1.

In the case of a planned service interruption, since service interruption information (start time, time period, etc.) is provided in advance, operations are started before the planned service interruption begins. The operator (4 in FIG. 1) for supplying power upon service interruption notifies the execution of a planned service interruption operation mode to the contractants (2 and 3 in FIG. 1) of power upon service interruption and to the owner (1 in FIG. 1) of the distributed power source, through a communication network (S8 in FIG. 9). Next, in step S9 in FIG. 9, the operator 4 adjusts the power value of loads within a local power network (not yet formed at this stage) to keep balance with the output power value of the distributed power source by the load power controllers (106, 206, and 306 in FIG. 1). Herein, the power consumption values of the loads are adjusted to conform to respective command values indicated by respective load power control command signals issued from the operator (4 in FIG. 1) for supplying power upon service interruption. Also, the output power of the distributed power source (111 in FIG. 1) is adjusted by the power source output controller (110 in FIG. 1) in step S10 in FIG. 9. Here, the power source output is adjusted to conform to a command value indicated by an output power control command signal issued from the operator (4 in FIG. 1) for supplying power upon service interruption.

Upon completion of the control of balance between the load power and the power source output, the switches (115, 210, and 310 in FIG. 1) for the time of service interruption are turned on (S11 in FIG. 9). This establishes a power supply route connecting the distributed power source with each load through the power line (6 in FIG. 1) exclusively for the time of service interruption. Herein, the switches for the time of service interruption are turned on by inputting respective switch turning-on command signals issued from the operator (4 in FIG. 1) for supplying power upon service interruption into the respective switch controllers (114, 209, and 309 in FIG. 1) through the respective relay devices (107, 213, and 313).

Then, the switches (103, 203, and 303 in FIG. 1) for normal times are turned off (S12 in FIG. 9). This provides the local power network having the distributed power source (111 in FIG. 1), serving as a power supply source. Here, the switches for normal times are turned on by inputting respective switch turning-on command signals issued from the operator (4 in FIG. 1) for supplying power upon service interruption into the respective switch controllers (104, 204, and 304 in FIG. 1) through the respective relay devices (107, 213, and 313). The turning-off of the switches for normal times may be performed either immediately before the service interruption or at the time of service interruption. It is, however, desirable to perform the turning-off immediately before the service interruption in order to alleviate the impact of service interruption exerted upon the distributed power source 111 through the power line 6.

Within the local power network having the distributed power source (111 in FIG. 1) serving as a power supply source, and finished off in step S12 in FIG. 9, the output power of the distributed power source and the load power are balance-controlled so as to get close to each other, thus keeping supply/demand balance (S13 in FIG. 9). Specifically, the output power value of the distributed power source is detected by the current censor (113 in FIG. 1) and the power value calculator (112 in FIG. 1), and transmitted to the operator (4 in FIG. 1) for supplying power upon service interruption, through the relay device (107 in FIG. 1). The load power value is also detected by the current censors (212 and 312 in FIG. 1) and the power value calculators (211 and 311 in FIG. 1), and transmitted to the operator (4 in FIG. 1) for supplying power upon service interruption, through the relay devices (213 and 313 in FIG. 1).

The operator (4 in FIG. 1) for supplying power upon service interruption can know a status of power supply/demand balance by comparing the sum total of each of the output power value and the load power value. For example, if the difference between supply and demand is zero, i.e., supply and demand are in balance, the present state is maintained. If the difference therebetween is positive, i.e., the output of the distributed power source is larger than the load power, either the output of the distributed power source is reduced or the load power is increased. Further, if the difference therebetween is negative, i.e., the load power is larger than the output of the distributed power source, either the load power is reduced or the output of the distributed power source is increased.

The output of the distributed power source (111 in FIG. 1) is adjusted by the power source output controller (110 in FIG. 1), which is controlled by a command signal issued from the operator (4 in FIG. 1) for supplying power upon service interruption. Also, the power consumption values of the loads (105, 108, 109, 205, 207, 208, 305, 307, and 308) are adjusted by the load power controllers (106, 206, and 306 in FIG. 1), which is controlled by a command signal issued from the operator (4 in FIG. 1) for supplying power upon service interruption. Such supply/demand balance control is continued until the planned service interruption is terminated (S14 in FIG. 9).

When it is determined, by the voltage sensors (101, 201, and 301 in FIG. 1) and the service interruption determining device (102, 202, and 302), that the planned service interruption has been terminated, the operator (4 in FIG. 1) for supplying power upon service interruption sends an advance notice of the termination of the planned service to the owner of distributed power source and to the contractants of power upon service interruption interruption operation mode, through the communication network (S15 in FIG. 9).

Here, firstly the switches (103, 203, and 303 in FIG. 1) for normal times are turned on (S16 in FIG. 9). Thereby, power is again supplied from the power system (5 in FIG. 1) of the electric utility. Herein, the switches for normal times are turned on by inputting respective switch turning-on command signals issued from the operator (4 in FIG. 1) for supplying power upon service interruption into the respective switch controllers (104, 204, and 304 in FIG. 1) through the respective relay devices (107, 213, and 313 in FIG. 1).

Next, the switches for the time of service interruption (115, 210, and 310 in FIG. 1) are turned off (S17 in FIG. 9). Thereby, the power supply from the distributed power source transfers to that from the power system (5 in FIG. 1) of the electric utility. Herein, the switches for the time of service interruption are turned off by inputting respective switch turning-on command signals issued from the operator (4 in FIG. 1) for supplying power upon service interruption into the respective switch controllers (114, 209, and 309 in FIG. 1) through the respective relay devices (107, 213, and 313 in FIG. 1).

Thereafter, the power source output control with respect to the distributed power source (111 in FIG. 1) is released (S18 in FIG. 9), and further, the load power control with respect to the loads (105, 108, 109, 205, 207, 208, 305, 307, and 308 in FIG. 1) is released (S19 in FIG. 9). Regarding the power source output control, a release command signal is issued from the operator (4 in FIG. 1) for supplying power upon service interruption, and an operation release is executed via the power source output controller (110 in FIG. 1). On the other hand, regarding the load power control, a release command signal is issued from the operator (4 in FIG. 1) for supplying power upon service interruption, and an operation release is executed via the load power controllers (106, 206, and 306 in FIG. 1). Upon completion of the foregoing processes, the operator (4 in FIG. 1) for supplying power upon service interruption notifies the termination of the planned service interruption operation mode to the owner of distributed power source and to the contractants of power upon service interruption, through the communication network (S20 in FIG. 9). Thus, the planned service interruption operation mode is terminated (S21 in FIG. 9).

(C) At Time of Unplanned Service Interruption

Figure 10:
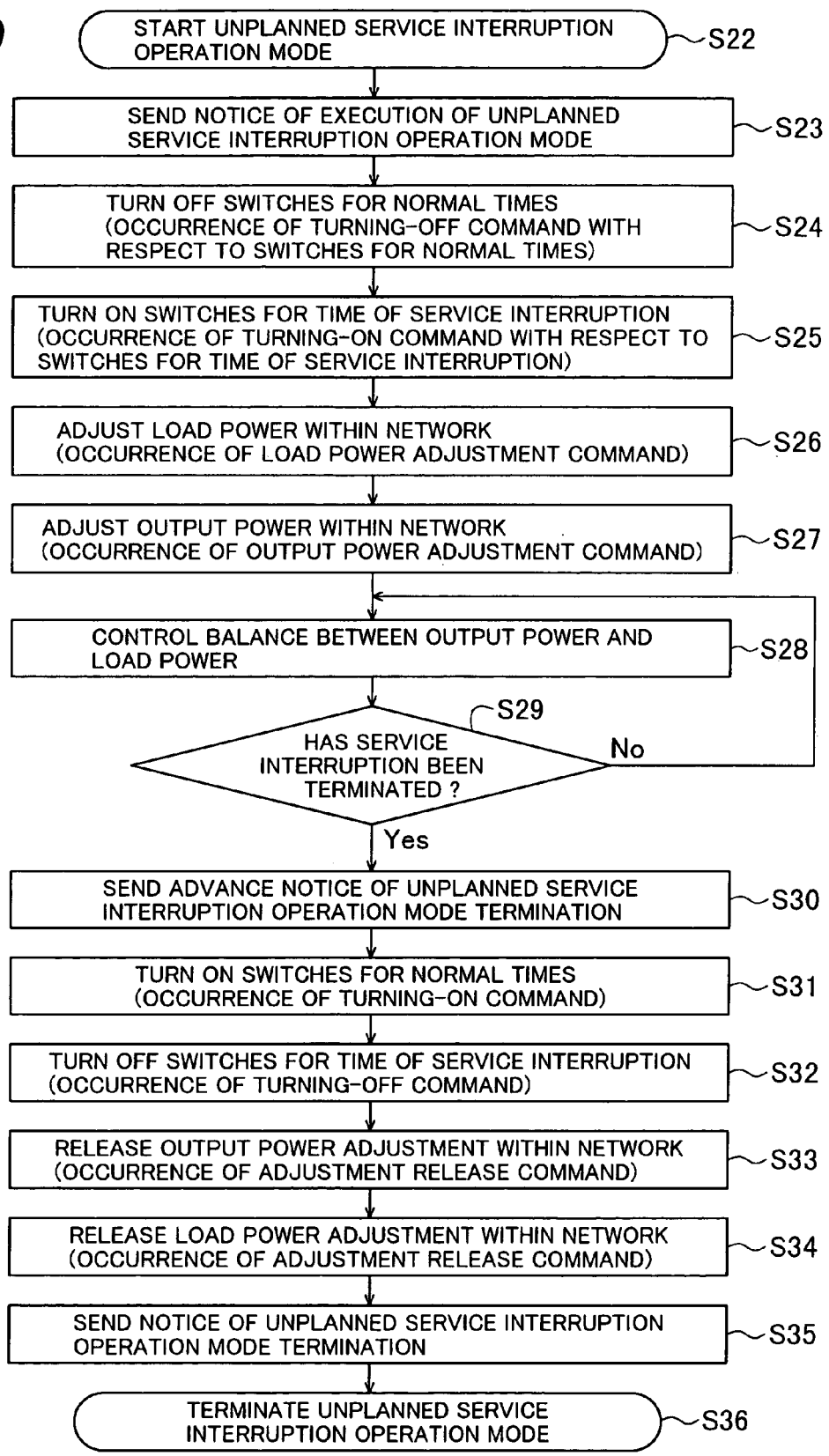
FIG. 10 is a flowchart showing an example of a handling process for determining an operation mode with respect to an unplanned service interruption in the power supply system with the distributed power source.

FIG. 10 is a flowchart showing processing of the power supply system at the time of an unplanned service interruption. The processing in FIG. 10 is basically the same as that in FIG. 9, but is different in the first half of the processing. Hereinafter, the flow is described mainly about the first half of the processing.

In the case of an unplanned accidental service interruption, operations are started upon detection of the service interruption. First, the operator (4 in Fig. 1) for supplying power upon service interruption notifies the execution of an unplanned service interruption operation mode to the contractants (2 and 3 in FIG. 1) of power upon service interruption and to the owner (1 in FIG. 1) of the distributed power source, through the communication network (S23 in FIG. 10). Next, the switches (103, 203, and 303 in FIG. 1) for normal times are turned off (S24 in FIG. 10), and further, the switches for the time of service interruption (115, 210, and 310 in FIG. 1) are turned on (S25 in FIG. 10). This provides a local power network connecting the distributed power source (111 in FIG. 1) with the contractants (2 and 3 in FIG. 1) of power upon service interruption by the power line (6 in FIG. 1) exclusively for the time of service interruption. Herein, the switches for normal times are turned off by inputting respective switch turning-on command signals issued from the operator (4 in FIG. 1) for supplying power upon service interruption into the respective switch controllers (104, 204, and 304 in FIG. 1) through the respective relay devices (107, 213, and 313 in FIG. 1). On the other hand, the switches for the time of service interruption are turned on by inputting respective switch turning-on command signals issued from the operator (4 in FIG. 1) for supplying power upon service interruption into the respective switch controllers (114, 209, and 309 in FIG. 1) through the respective relay devices (107, 213, and 313).

Thereafter, the power consumption values of the loads within the local power network are adjusted to keep balance with the output power value of the distributed power source by the load power controllers (106, 206, and 306 in FIG. 1) in step S26 in FIG. 10, and the output power of the distributed power source (111 in FIG. 1) is also adjusted by the power source output controller (110 in FIG. 1) in step S27 in FIG. 10. Here, the power consumption values of the loads are adjusted to conform to the respective command values indicated by respective load power control command signals issued from the operator (4 in FIG. 1) for supplying power upon service interruption. On the other hand, the power source output is adjusted to conform to a command value indicated by an output power control command signal issued from the operator (4 in FIG. 1) for supplying power upon service interruption.

In this manner, in the operations at the time of an unplanned service interruption, the turning-off of the switches for normal times is performed at first, and thereafter, the turning-on of the switches for the time of service interruption is performed. This is because, now that a service interruption has already occurred for some reason, the alleviation of secondary influences is aimed at by firstly turning off the switch for normal times to disconnect the loads and the distributed power source from the power system.

Step S28 and later steps in FIG. 10 are the same as those in FIG. 9.

As described above, according to the embodiment shown in FIGS. 1, 9, and 10, the following effects are obtained.

The provision of the switches for the time of service interruption and the switch controllers therefor, and the switches for normal times and the switch controllers therefor, allows a local power network comprising specified loads (loads requiring power supply upon service interruption) and a distributed power source to be formed upon service interruption. In this power network, supply and demand of power can be implemented without interruption. Therefore, by selectively supplying power to specified loads, it is possible to allocate a limited power of the distributed power source to predetermined loads (loads requiring power supply upon service interruption). Also, if power of the distributed power source is being sold to an electric utility, then, upon service interruption, power can be sold to the loads that are being supplied with power (in the case of FIG. 1, these loads correspond to the contractant(s) of power supply upon service interruption). This allows a profit by power-selling to be made without interruption.

The provision of the power source output controllers and the load power controllers allows the supply/demand balance of power to be controlled by both of the load power control and the power source output control. Particularly, regarding the control of the load power, there is hitherto provided control only by the opening/closing of switches, and hence, when the load power is excessive, there has been no choice but to disconnect loads. However, in this embodiment, control for reducing the load power enables balance between supply and demand of power to be struck without the need for disconnecting the loads.

The provision of the current sensors and the power value calculators allows the present state of the supply/demand balance of power to be detected. Also, the combination of the power source controller and the load power controller enables the supply/demand balance of power to be more correctly feedback-controlled, thereby allowing the local power supply network upon service interruption to be stably maintained.

The provision of the voltage sensors and the service interruption determining device enables even the occurrence of an accidental service interruption other than an planned service interruption to be detected, thereby allowing a local power network to be immediately formed. Also, when an planned service interruption is not actually performed or when the planned service interruption is released earlier than would be expected, it is possible to quickly cancel the local power network and transfer the power supply from the local power network to that from the original electric utility.

By the operator for supplying power upon service interruption performing operations upon service interruption, a local power network can be constructed, without either of the load (corresponding to the contractant of power supply upon service interruption) and the owner of distributed power source performing operations (complicated operations), on its own. Also, by the operator for supplying power upon service interruption supervising the whole of the local power network and control it by a centralized management, it is possible to properly control the supply/demand balance in the network in its entirety. Furthermore, by the operator supervising the whole of the local power network and controlling it by a centralized management, it is possible to properly provide the timing of starting or terminating the local power network. Besides, the operator for supplying power upon service interruption remotely monitor the occurrence of a service interruption at all times, and therefore, even if an accidental service interruption occurs, the operator can detect it and immediately perform an operation for forming a local power network, thereby allowing the impact of the service interruption on the load side to be reduced to a lesser extent.

In the case of a planned service interruption, before the service interruption, initial operations for forming a local power network are performed by previously controlling the balance between the output power and the load power, and thereafter conducting opening/closing of the switches for normal times and the switches for the time of service interruption. This enables the transitional impact (shocks) at the time of the occurrence of service interruption to be inhibited. Also, this allows the supply/demand balance of power to be kept from the initial point in time when the local power network was formed.

In the case of an unplanned service interruption, after having detected the occurrence of service interruption, initial operations are performed such as to firstly conduct opening/closing of the switches for normal times and the switches for the time of service interruption, and thereafter control the balance between the output power and the load power. This allows the balance of supply/demand of power to be quickly struck. That is, a power supply by a local power network can be started sooner from the time of the occurrence of service interruption.

After a service interruption has occurred, the output of the distributed power source and the load power are detected and the difference therebetween is calculated. In accordance with this difference, the output of the distributed power source and the power consumption of the loads are controlled. This enables more correct control of the supply/demand balance, thereby allowing the local power network to be stably maintained.

By canceling the local power network after the service interruption has been terminated, the transfer from the local power network to the network connecting to the power system of the electric utility can be smoothly performed. Also, by releasing the power control after the switches have been changed over, it can be prevented that the supply/demand balance is transitionally lost upon canceling of the local power network.

Figure 7:
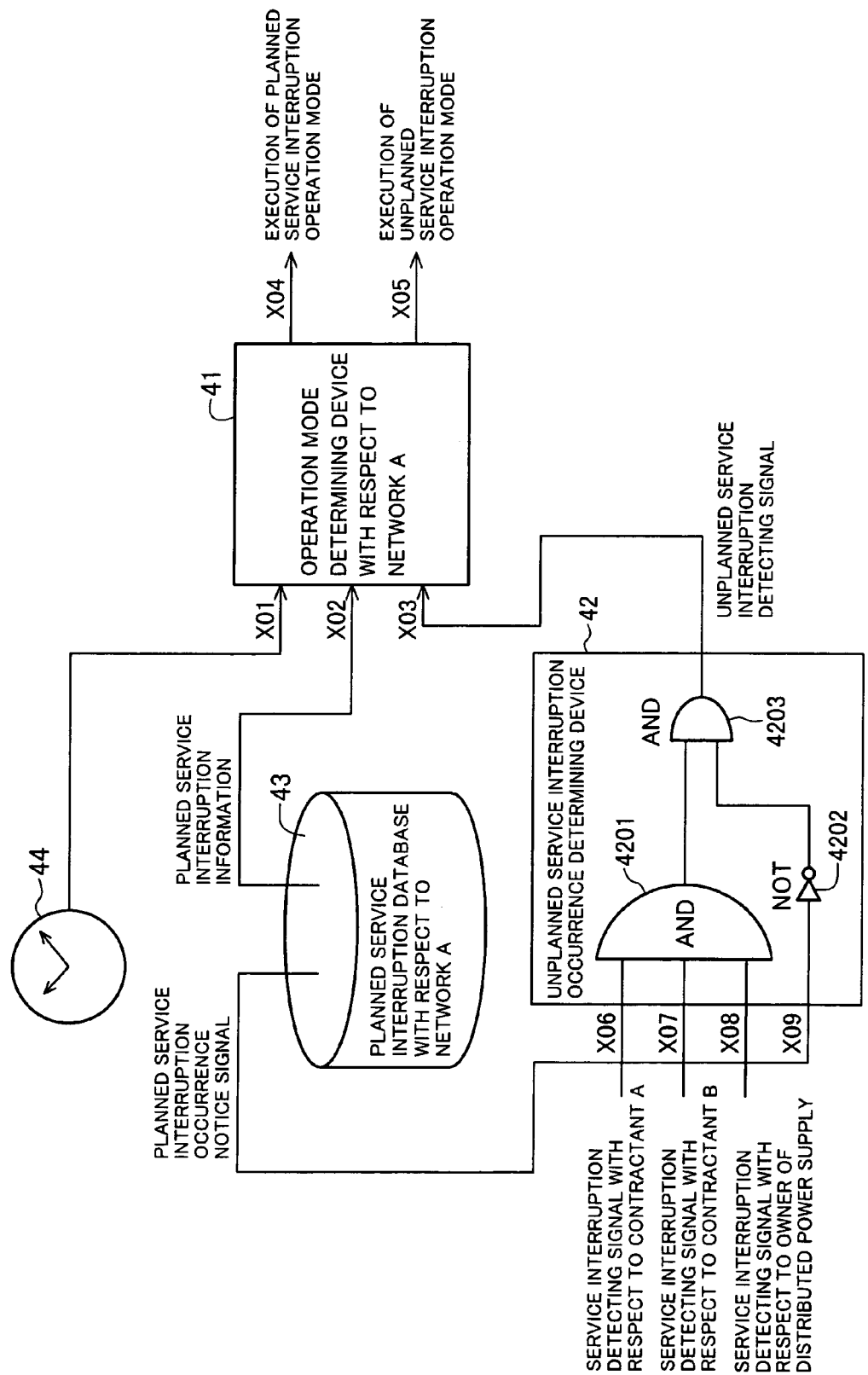
FIG. 7 is a diagram showing an example of a handling process for determining an operation mode with respect to a service interruption in the power supply system with the distributed power source.

Next, operations by the operator (corresponding to 4 in FIG. 1) for supplying power upon service interruption will be described with reference to FIG. 7. FIG. 7 shows a flow of processing for determining the service interruption operation mode by the operator (corresponding to 4 in FIG. 1) for supplying power upon service interruption. The following is processing by the operator for supplying power upon service interruption.

(A) Determination of Planned Service Interruption Operation Mode

Figure 8:
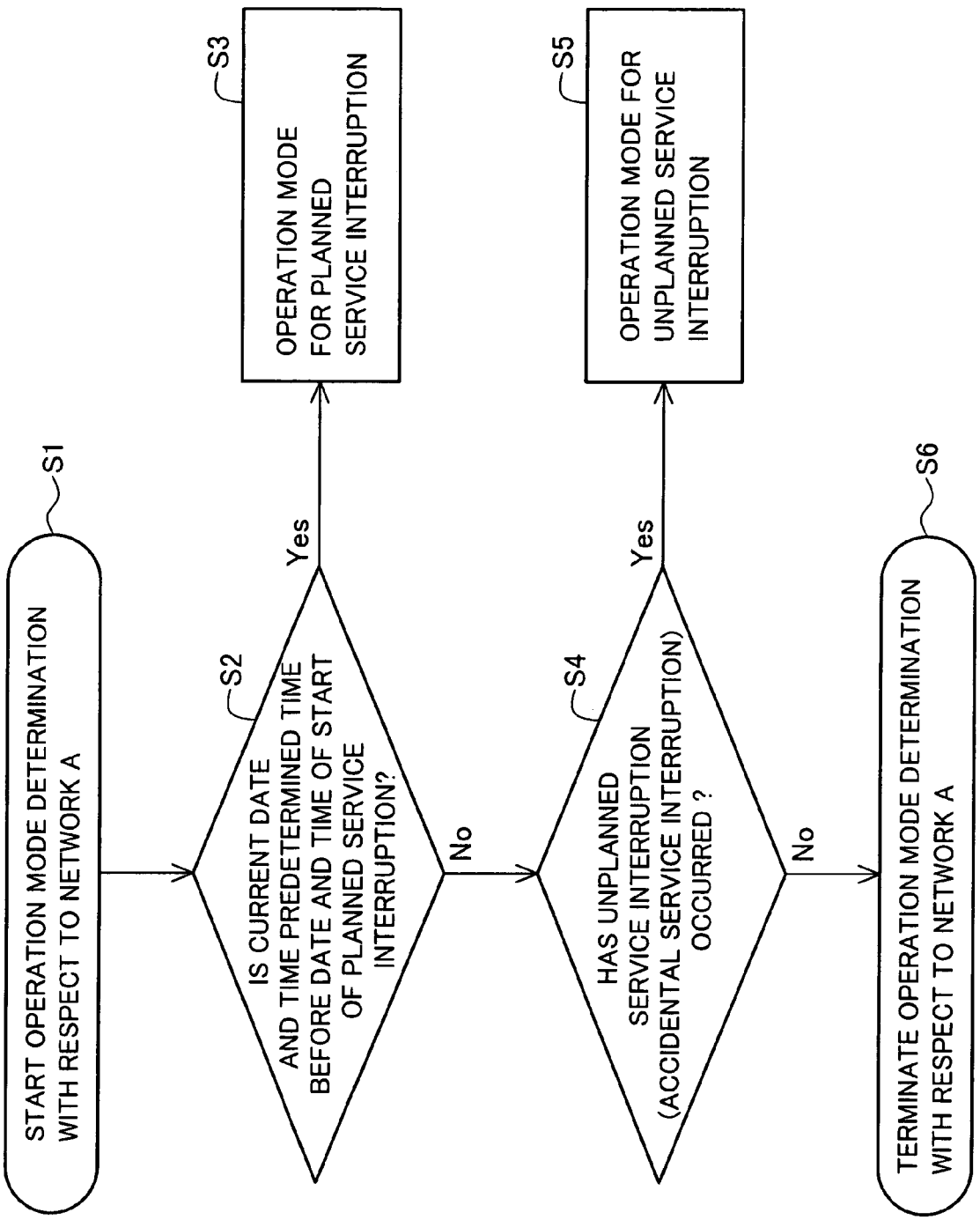
FIG. 8 is a flowchart showing an example of a handling process for determining an operation mode with respect to a service interruption in the power supply system with the distributed power source.

Planned service interruption information X02 (the date and time of the start of a service interruption, and the date and time of the termination of service interruption) is read from a planned service interruption database 43 for a power network A (this is a group forming a local power network with a distributed power source upon service interruption, and the network targeted here is referred to as "A" for the sake of convenience; this corresponds to the power network shown in FIG. 1). This information X02 and the current date and time information X01 obtained from a clock 44 are compared by an operation mode determining unit 41 for the network A, for determination. Upon determining that the current date and time is immediately before the date and time of the planned service interruption, the operation mode determining unit 41 for the network A outputs a command for executing the planned service interruption operation mode. FIG. 8 is a flowchart showing a flow of determination processing of the operation mode determining unit 41 for the network A. When the current date and time is a predetermined (e.g., 10 minutes) before the date and time of the start of the planned service interruption (S2 in FIG. 8), the planned service interruption operation mode is put into operation (S3 in FIG. 8). Thus, immediately before the date and time of the planned service interruption, the planned service interruption operation mode in FIG. 9 is executed.

(B) Determination of Unplanned Service Interruption Operation Mode

In an unplanned service interruption determining device 42 shown in FIG. 7, the logical product of a service interruption detection signal X06 with respect to a contractant A (the contractant A of power upon service interruption in FIG. 1), a service interruption detection signal X07 with respect to a contractant B (the contractant B of power upon service interruption in FIG. 1), and a service interruption detection signal X08 with respect to an owner of distributed power source, is calculated by a logical product operating unit 4201. Furthermore, this result and the result obtained by taking, using a logical NOT operating unit 4202, the negation of a planned service interruption occurrence notice signal X09 obtained from the planned service interruption database 43 for the network A, are calculated by a logical product operating unit 4203. Here, the detection signal takes "1" when it detects a service interruption, and otherwise it takes "0". Also, the planned service interruption occurrence notice signal retrieves information from the data of the planned service interruption database, and takes "1" when a planned service interruption occurs, and otherwise it takes "0". Therefore, when a service interruption is detected in the system facilities of the contractants A or B of power upon service interruption, or the owner of distributed power source, and when the service interruption is not planned one, the unplanned service interruption determining device 43 outputs an unplanned service interruption detection signal with the value of "1" (i.e., it outputs a signal indicating that an unplanned service interruption has been detected).

Once an unplanned service interruption has been detected, the operation mode determining unit 41 for the network A outputs a command signal for executing the unplanned service interruption operation mode. The flow of determination processing of the operation mode determining unit 41 for the network A is illustrated in FIG. 8. With the occurrence of an unplanned service interruption detected (S4 in FIG. 8), the unplanned service interruption operation mode in FIG. 10 is executed (S5 in FIG. 8).

Here, the service interruption detection signals with respect to the facilities of the contractant A of power upon service interruption, the facilities of the contractant B of power upon service interruption, and the facilities of the owner of distributed power source, respectively, are outputted from the service interruption determining device 202 in FIG. 1, the service interruption determining device 302 in FIG. 1, and the service interruption determining device 102 in FIG. 1.

Since the operator for supplying power upon service interruption can execute operations in correspondence with both the cases of planned service interruption and unplanned service interruption, it can reliably construct a local power network with respect to long-term and diverse service interruptions. That is, upon service interruption, it is possible supply power to loads by making effective use of power of a distributed power source. Also, taking advantage of information of the planned service interruption database and the data and time information of the clock, the operator for supplying power upon service interruption starts an operation prior to the occurrence of a planned service interruption, and hence, it can supply power without interruption even if the service interruption begins. Furthermore, it is possible to alleviate transitional shocks at the time of service interruption with respect to the local power network, thereby allowing the system to be kept more stable. Moreover, since the operator for supplying power upon service interruption is performing the detection of a service interruption based on the logical product of service interruption detecting information in the facilities of contractants of power upon service interruption and the facilities of the owner of distributed power source, it executes an operation for constructing a local power network with respect to an unplanned service interruption that has occurred within a local power network in its entirety (in this case, the network is not yet a closed one). It is also possible to reduce, to a minimum, malfunctions caused by misdetecting a non-service interruption state as a service interruption state. In the service interruption determination, since the processing is performed so as to exclude the case of the planned service interruption (i.e., a logical product of the negation of the planned service interruption occurrence notice signal and the service interruption detection signal is taken), the unplanned service interruption can be distinguished from the planned service interruption. As a result, when a service interruption is determined as a planned service interruption, a planned service interruption operation can be selected and executed, and when a service interruption is determined as an unplanned service interruption, an unplanned service interruption operation can be selected and executed. That is, it is possible to execute a coping method (operations) corresponding to an actual service interruption state.

Next, operation contents concerning power supply/demand balance control by the operator (corresponding to 4 in FIG. 1) for supplying power upon service interruption, will be described with reference to FIG. 16. FIG. 16 shows a flow of the processing with respect to the power supply/demand balance control by the operator (corresponding to 4 in FIG. 1) for supplying power upon service interruption.

First, the total load amount (total power consumption of loads) within the local power network is to be determined. This can be determined by adding together, by an adder 601, the total load amount for the owner of distributed power source, that for the contractant A of power upon service interruption, and that for the contractant B of power upon service interruption. Here, for example, the total load amount for the contractant A of power upon service interruption, can be successively monitored by the current sensor 212 and the power value calculator 211 through the communication line.

Next, from the power generation amount of the distributed power source of the owner of distributed power source, the total load amount within the local power network that has previously been determined, is subtracted by a subtracter 602, thereby determining a supply/demand deviation in the local power network. Here, the power generation amount of the distributed power source of the owner of distributed power source can successively be known based on the present power generation output command value that is being given to the power source output controller 110 in FIG. 1, and the power supply amount obtained from the current sensor 113 and the power value calculator 112.

On the basis of the supply/demand deviation in the local power network that has previously been determined, rated capacity data of each load obtained from the facility database 604 with respect to a targeted local power network, rated output data of the distributed power source, present load amount data of each load, and power generation amount data of the distributed power source, a command creating section 603 outputs an output power command signal with respect to the distributed power source, a load power control command signal with respect to the owner of distributed power source, a load power adjustment command signal with respect to the contractant A of power upon service interruption, and a load power adjustment command signal with respect to the contractant B of power upon service interruption, thus issuing a command signal to each of them through the communication line.

For example, when the load amount in the local power network is large, this can be detected since the deviation determined by the subtracter 602 becomes negative. In this case, either the power generation amount is to be increased, or the load amount is to be reduced. First, the rated output data (acquired from the facility database 604) and the present power generation amount are compared. As a result, if it is found to be possible to increase the power generation amount, the power generation amount is increased. In other words, the output power command value with respect to the distributed power source is increased. On the other hand, if it is found to be difficult to increase the power generation amount, an operation for reducing the load amount is performed. In this case, based on the rated capacity data (acquired from the facility database 604) of each load and the present load amount data of each load, the load amounts of loads are adjusted in descending order of rating margin of load. For example, when the total load amount of the contractant A of power upon service interruption is in the closest vicinity of the rated capacity, this is regarded as having margin of reduction in load, and the load power adjustment command value with respect to the contractant A of power upon service interruption is reduced.

In this way, the operator (corresponding to 4 in FIG. 1) for supplying power upon service interruption succeedingly monitors the power generation amount of the local power network and individual load amounts to determine the supply/demand deviation within the local power network, and succeedingly issues output power commands with respect to the distributed power source and load power adjustment commands so as to be zero for the supply/demand deviation of the local power network, thereby allowing the supply/demand balance within the local power network to be stably kept.

Now, descriptions will be made of contents of respective one of the processing operations with respect to each of the devices (service interruption determining devices, switch controllers, load controllers) shown in FIG. 1.

Figure 11A:
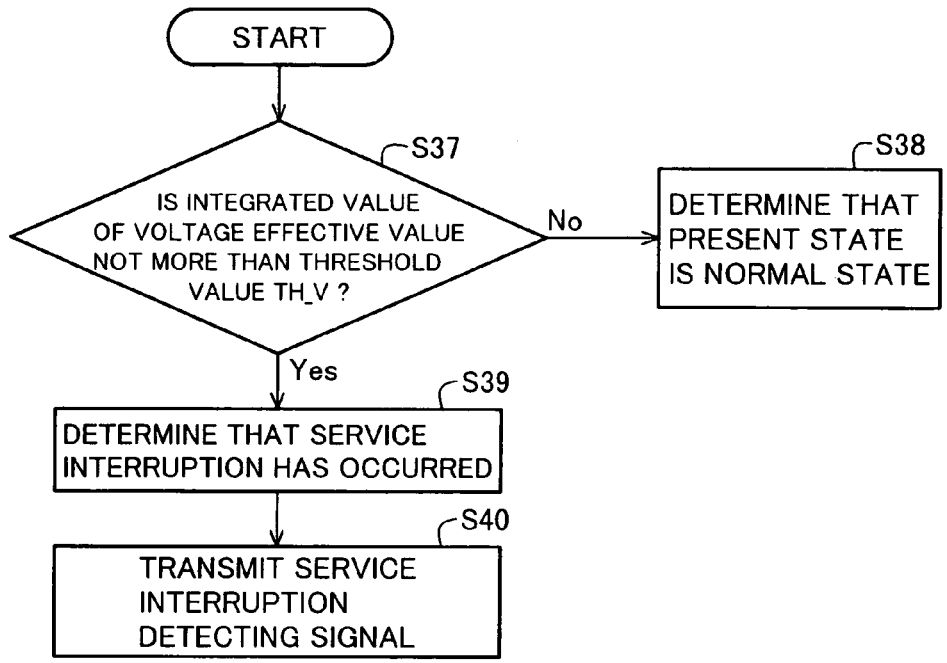
FIGS. 11A and 11B are flowcharts showing examples of handling processes of an interruption determining device with respect to the power supply system with the distributed power source.
Figure 11B:
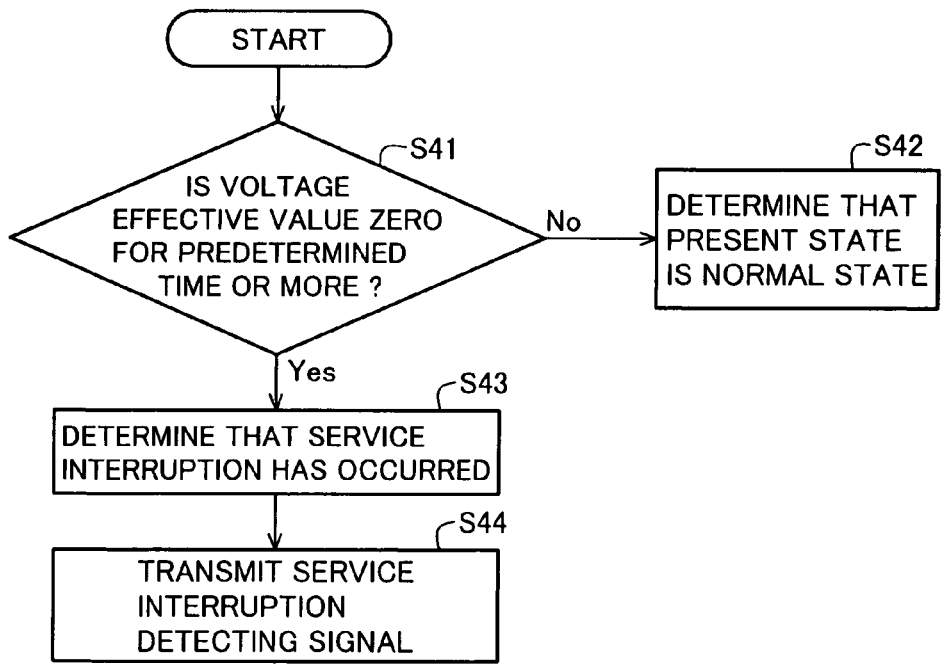

FIGS. 11A and 11B show flows of processing with respect to the service interruption determining device. FIG. 11A illustrates the case where a power source for the service interruption determining device is obtained from a power line. Herein, it is determined whether the integrated value of voltage effective values detected from the voltage sensors (101, 201, and 301 in FIG. 1) is not more than a threshold value (TH_V) in step S37. If the integrated value is not more than the threshold value, it is determined that a service interruption has been occurred (S39), and transmits a service interruption detection signal (S40). On the other hand, if the integrated value is larger than the threshold value, it is determined that the present state is a normal state (S38). When the power source for the service interruption determining device is obtained from the power line, there is a possibility that the service interruption determining device itself comes to a stop after service interruption. However, by determining whether the present state is a service interruption state, based on whether the integrated value of the voltage effective values is not more than the threshold value, it is possible to detect the occurrence of a service interruption before the service interruption determining device comes to a stop. Here, the purpose of using integrated values is to prevent a malfunction due to noises or the like.

FIG. 11B shows a flow of processing in the case where a power source for the service interruption determining device is obtained from a battery (or the case where driving power can be obtained for a while from a capacitor or the like). In this case, it is checked whether voltage effective values detected from the voltage sensors (101, 201, and 301 in FIG. 1) are zero for a predetermined time period or more (S41). If they are zero for the predetermined time period or more, it is determined that a service interruption has occurred (S43), and a service interruption detection signal is issued (S44). Otherwise, it is determined that the present state is a normal state (S42). In this manner, when the service interruption determining device is operable even during service interruption, the occurrence of a service interruption can be directly determined by the length of time period during which the voltage remains zero. This approach can detect a service interruption more directly, thereby offering the advantage of reducing malfunctions.

FIG. 12 shows a flow of processing with respect to the switch controllers. First, it is checked whether the switch controller has received a switch turning-off command (S45). If the switch controller has received the switch turning-off command, it immediately turns off switches (103, 115, 203, 210, 303, and 310 in FIG. 1) in step S48. On the other hand, if the switch controller has not received the switch turning-off command, it is now checked whether the switch controller has received a switch turning-on command (S46). If the switch controller has received the switch turning-on command, it immediately turns on the switches (S47). In this manner, by sending commands to the switch controller to control the opening/closing operations of switches, it is possible to remotely execute the formation and the cancellation of a local power network upon service interruption, without delay.

Figure 13A:
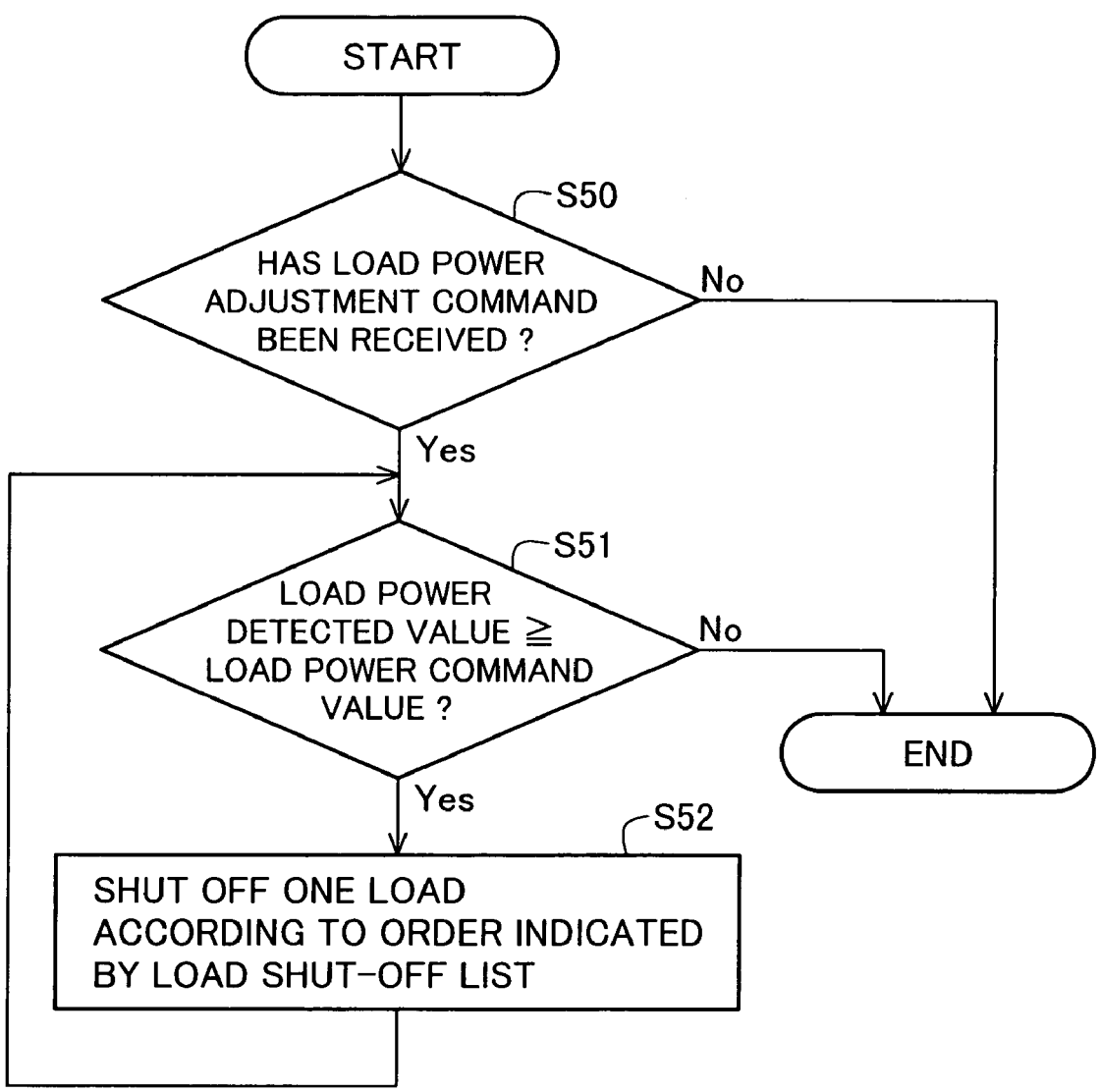
FIGS. 13A and 13B are flowcharts showing examples of handling processes of load controllers with respect to the power supply system with the distributed power source.
Figure 13B:
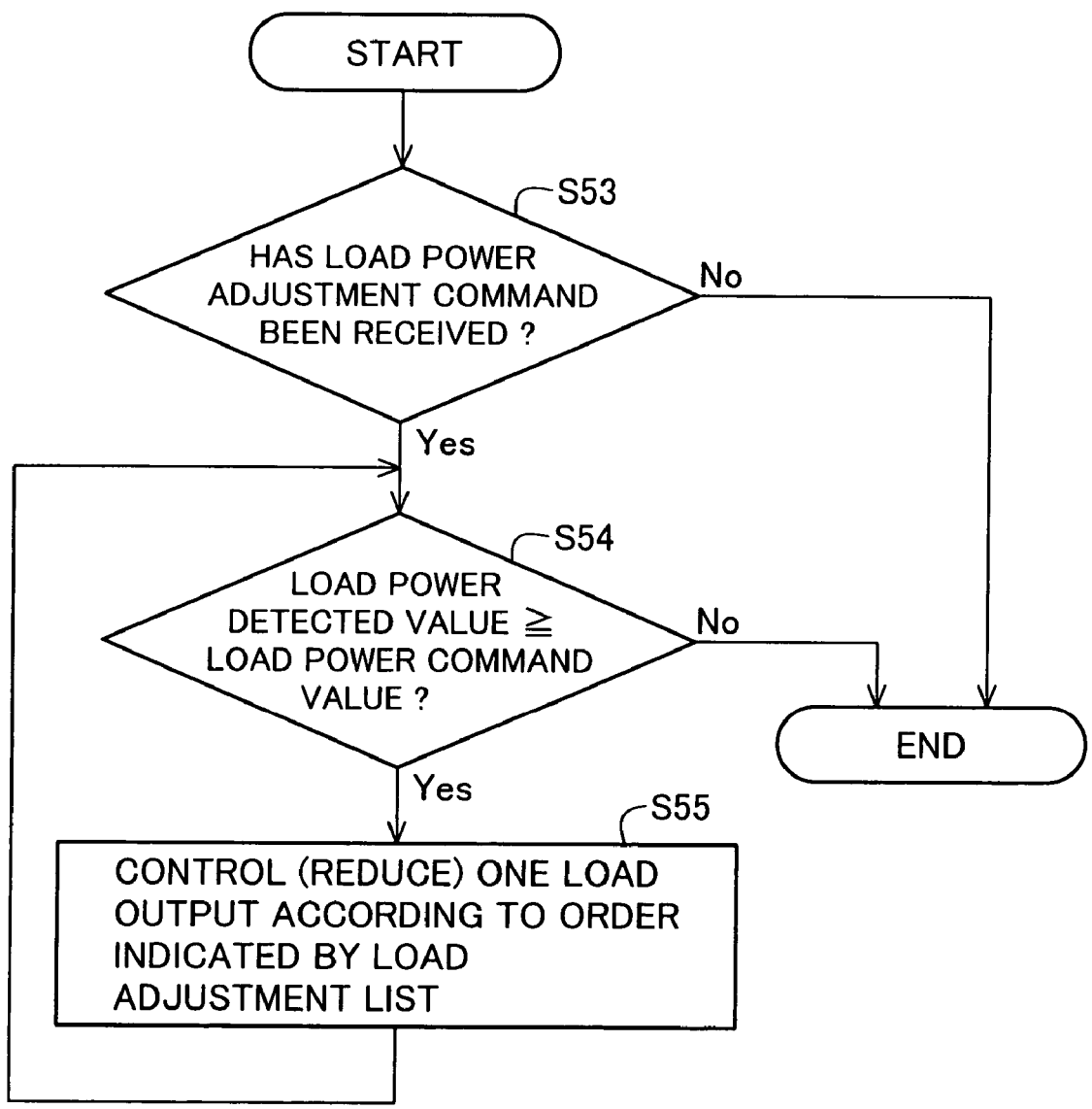
Figure 14A:
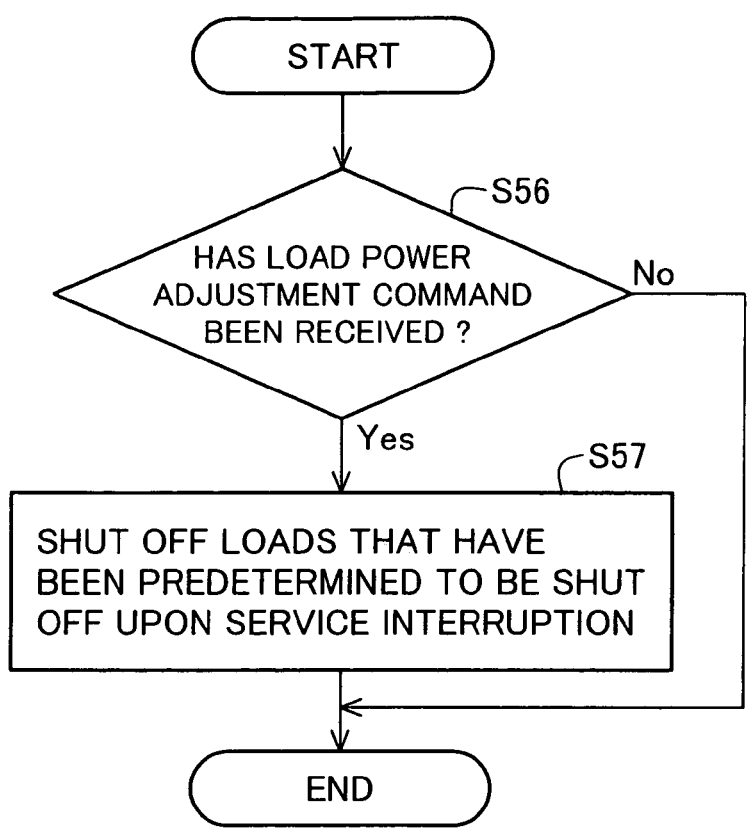
FIGS. 14A and 14B are flowcharts showing examples of handling processes in initial operations of the load controllers with respect to the power supply system with the distributed power source.
Figure 14B:
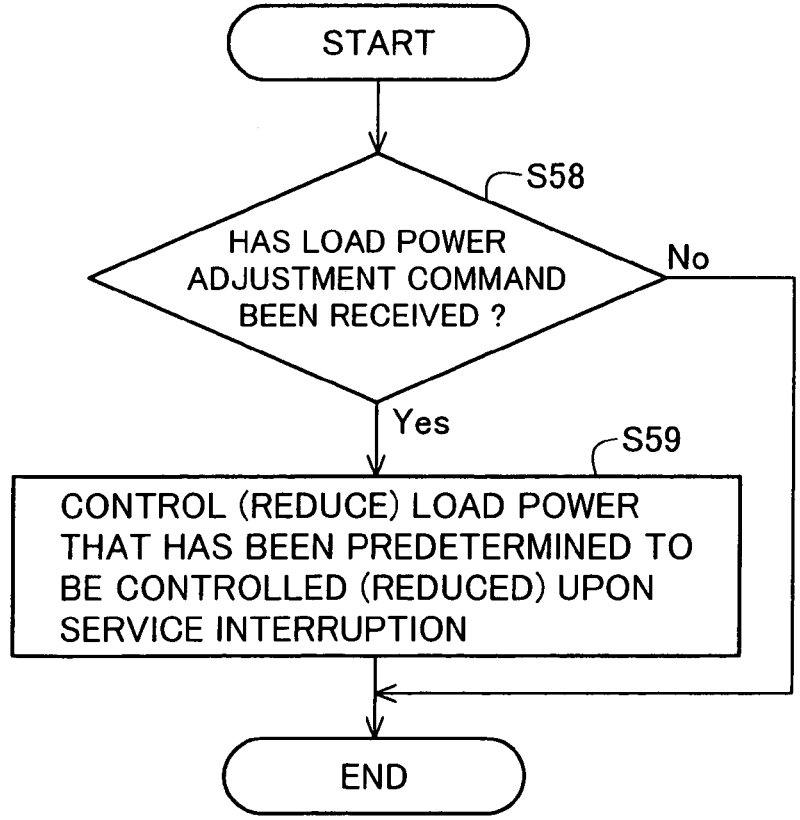

FIGS. 13A and 13B, and FIGS. 14A and 14B show flows of processing with respect to the load controllers. FIGS. 13A and 13B are diagrams each illustrating a flow of processing in a steady state (S13 in FIG. 9 and S28 in FIG. 10), while FIGS. 14A and 14B are diagrams each illustrating a flow of processing in an initial state (S9 in FIG. 9 and S26 in FIG. 10).

FIG. 13A shows a flow of processing in which, in a steady state, loads continue to be shut off one after another until the power supply/demand is brought into balance, in accordance with a load shut-off list (i.e., list on which loads are listed in ascending order of the influence of their being shut off). Upon receipt of a load power adjustment command (S50), the load controller compares a load power detected value (obtained from the power value calculators 112, 211, and 311 in FIG. 1) with a load power command value (S51). If the load power detected value is larger than the load power command value, the load controller shuts off one load in accordance with the load shut-off list (S52), and thereafter, again compared the load power detected value with the load power command value (S51). In this way, loads continue to be shut off one after another in accordance with the order indicated by the load shut-off list until the load power detected value becomes the load command value or less. Here, the load power control command and the load power command value are issued from the operator (4 in FIG. 1) for supplying power upon service interruption, and are inputted into the load controller through the relay devices (107, 213, and 313 in FIG. 1).

The processing shown in FIG. 13B is different from that shown in FIG. 13A in that the load is not shut off but the load power is controlled, i.e., the power consumption of the load is reduced.

As in FIGS. 13A and 13B, remotely controlling the load power via communications allows balance between supply and demand of power to be struck more rapidly, thereby enabling the local power network to be stably maintained. Also, since the present load power and the load power command value are compared to control the load power, it is possible to keep supply/demand of power in balance more correctly, and keep the local power network stable. Furthermore, since the order of the control with respect to the load power is conformed to the order indicated by the load control list, loads can be controlled in ascending order of the influence of their being controlled.

FIG. 14A shows a flow of processing at an initial stage of operations at the time of service interruption. At the initial stage of operations at the time of service interruption, upon receipt of a load power adjustment command (S56), the load controller immediately shuts off loads that have been predetermined to be shut off upon service interruption (S57).

The processing shown in FIG. 14B is different from that shown in FIG. 14A in that loads are not shut off but the load power is controlled, i.e., the power consumption of the load is reduced.

By the processing in FIGS. 14A and 14B, at the initial stage of operations at the time of service interruption, it is possible to immediately bring the power consumption of loads and the output power of a distributed power source into balance or get them close to each other. In other words, a local power network can be made stable without delay. Here, the load control as in FIGS. 14A and 14B is effective in striking balance between the output power and the load power, especially in the case where the output power of the distributed power source has substantially been determined.

Next, reference will be made to a power supply business upon service interruption by the distributed power source shown in FIG. 1.

Figure 3:
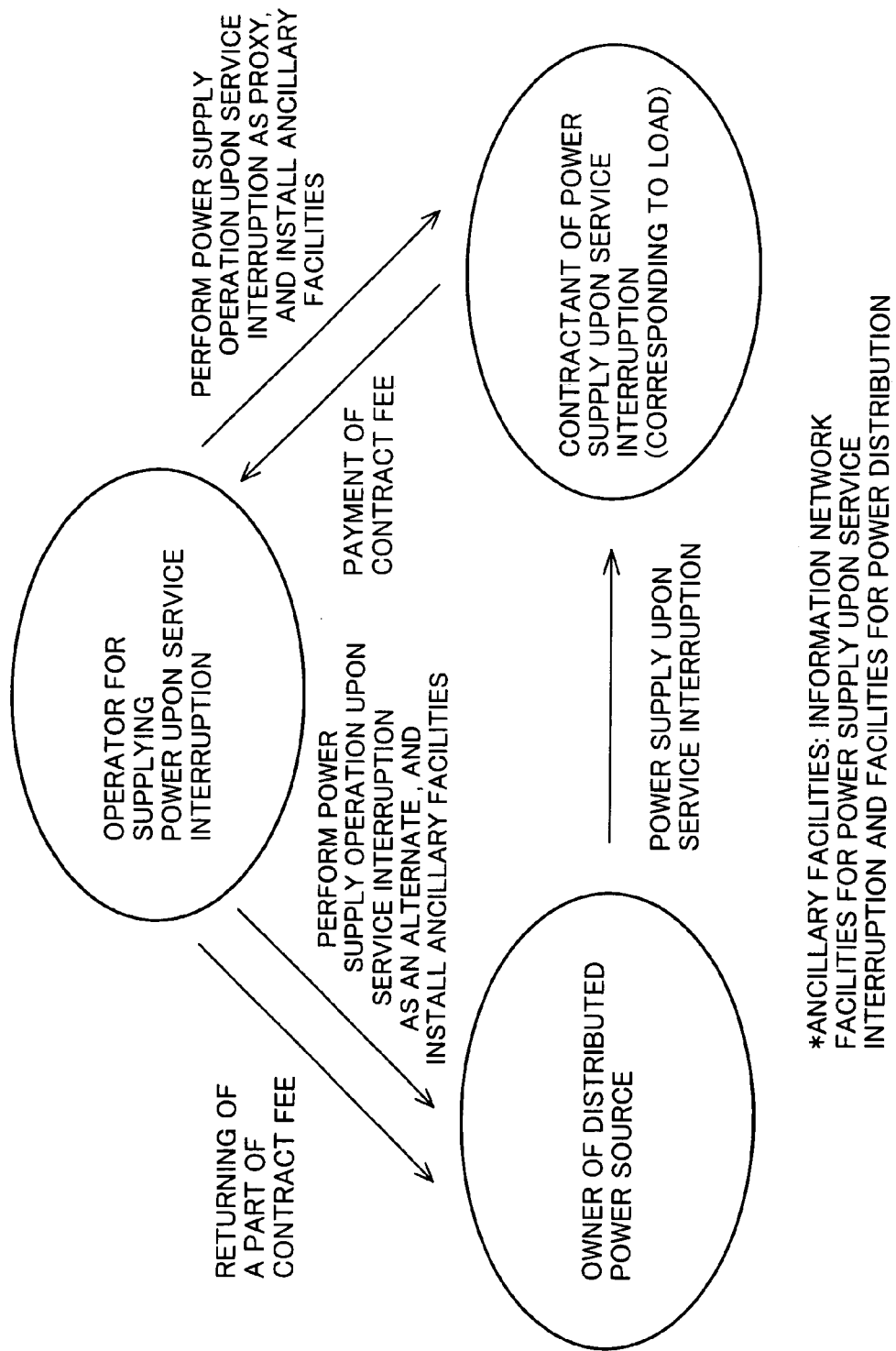
FIG. 3 shows an example of a business concept with respect to the power supply system with the distributed power source.

FIG. 3 shows an example of a business concept with respect to a local power network upon service interruption with a distributed power source. The operator for supplying power upon service interruption performs a power supply operation upon service interruption and the installation of ancillary facilities (switches, controllers, communication terminals, communication lines, etc.) for the contractants of power supply upon service interruption. As compensation for it, the operator for supplying power upon service interruption receives a contract fee. Here, the contract fee is a kind of insurance premium, and the operator for supplying power upon service interruption can receive the contract fee on a fixed-price basis irrespective of whether a service interruption actually occurs. On the other hand, the operator for supplying power upon service interruption returns a part of the aforementioned contract fee to the owner of distributed power source, and further performs a power supply operation upon service interruption and the installation of ancillary facilities for the owner of distributed power source. The owner of distributed power source provides the contractant of power supply upon service interruption with a part of power of the distributed power source at the time of service interruption.

The contractant of power supply upon service interruption can secure stable destinations of power supply against a long-term service interruption only by paying the contract fee, without the need to having an uninterruptible power supply system, which requires its own power generating facilities and an installation space therefor, thereby allowing avoidance of a risk. Thus, the owner of distributed power source can make a definite profit irrespective of whether a service interruption actually occurs. Also, it is unnecessary for the owner of distributed power source to perform complicated operations upon service interruption and install ancillary facilities. That is, at normal times, the owner of distributed power source can use the distributed power source already owned thereby as usual, and can make a definite profit merely by distributing a part of generated power only at the time of service interruption. In particular, when selling power of the distributed power source to an electric utility (power provider) at normal times, the owner of distributed power source has a significant advantage since it has destinations of the sold power even during service interruption. The operator for supplying power upon service interruption can also earn a definite profit at all times.

Figure 4:
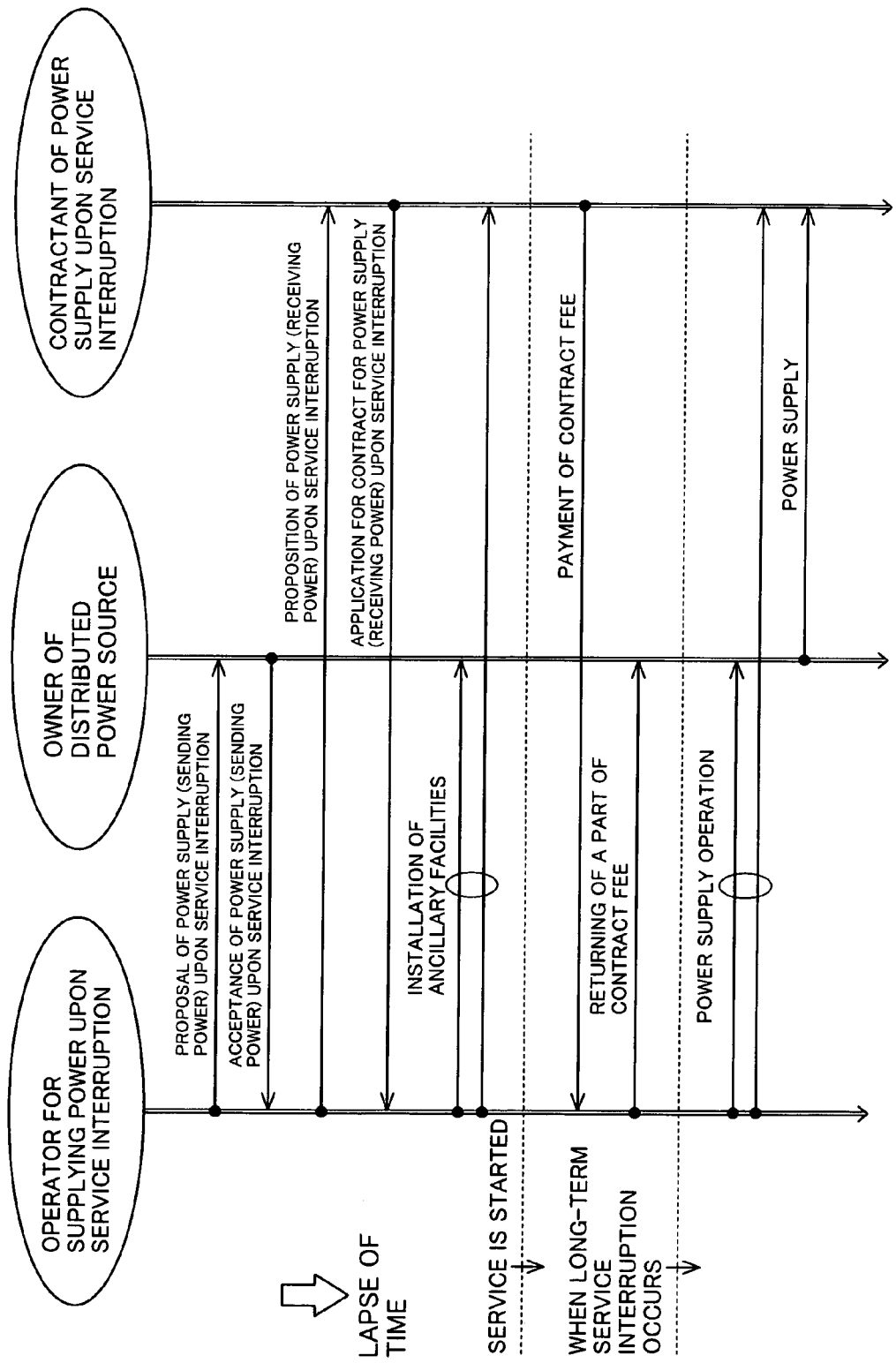
FIG. 4 is a diagram showing details of contract forms regarding the introduction and management of the power supply system with the distributed power source, the contract forms being expressed as a time-series process.

FIG. 4 illustrates an example of contract process in the business concept with respect a local power network upon service interruption with a distributed power source. FIG. 4 shows the lapse of time in the downward direction. Hereinafter, the flow of process will be explained along the lapse of time. First, the operator for supplying power upon service interruption makes a proposal to supply a part of power to the outside upon service interruption, to the owner of distributed power source. When this proposal is accepted, the operator for supplying power upon service interruption now makes a proposal concerning a contract to receive power supply upon service interruption, to power customers around the owner of distributed power source. Once the contract to receive power supply upon service interruption has come to an agreement and an application for the contract has been made, the power customer becomes a contractant of power supply upon service interruption. At the point in time when the contract between the owner of distributed power source and the contractant of power supply upon service interruption has been inked, the operator for supplying power upon service interruption installs ancillary facilities (switches, controllers, communication terminals, communication lines, etc.), and after completion of the facilities, the operator for supplying power upon service interruption brings the facilities into operation, thus starting service. After the service has started, the contractant of power supply upon service interruption pays a contract fee to the operator for supplying power upon service interruption. On the other hand, the operator for supplying power upon service interruption returns a part of the contract fee to the owner of distributed power source. That is, at this stage, each of the operator for supplying power upon service interruption and the owner of distributed power source makes a profit. Also, when a long-term service interruption has occurred, the operator for supplying power upon service interruption performs a power control operation at the time of service interruption with respect to each of the owner of distributed power source and the contractant of power supply upon service interruption. Thereby, the contractant of power supply upon service interruption can receive power supply from the owner of distributed power source. This allows the occurrence of risk due to a long-term service interruption to be avoided.

In the business concept shown in FIG. 3, such changes are possible that the operator for supplying power upon service interruption owns a distributed power source and that the contractant of power upon service interruption owns one.

Next, embodiments concerning an information system in the local power supply system upon service interruption will be described with reference to FIGS. 15, 5, and 6.

FIG. 15 shows an information system in the local power supply network with a distributed power source at the time of a long-term service interruption. This information system discloses, through an information network, information on a local power supply network, such as current statuses, occurrence information of a planned service interruption, etc.

In FIG. 15, an operator 50 (same as 4 in FIG. 1) for supplying power upon service interruption has an information server 55; an owner of distributed power source 51 (same as 1 in FIG. 1) has an information terminal 56; a contractant A (51) (same as 2 in FIG. 1) of power supply upon service interruption has an information terminal 57; and a power supplier B (52) (same as 3 in FIG. 1) upon service interruption has an information terminal 58. The information server 55 and the information terminals 56, 57, and 58 are interconnected with one another through a communication network (in this case, the Internet) 54. Here, the information server 55 is, e.g., a personal computer.

The information server 55 of the operator 50 for supplying power upon service interruption monitors information collected on the side of the operator for supplying power upon service interruption, such as statuses of power networks, statuses of switches, power generation amounts, load amounts, service interruption information, etc. The information server 55 distributes these pieces of information to the information terminal 56 of the owner 51 of distributed power source, the information terminal 57 of the contractant A of power supply upon service interruption, and the information terminal 58 of the power supplier B upon service interruption, through the communication network 54.

Figure 5:
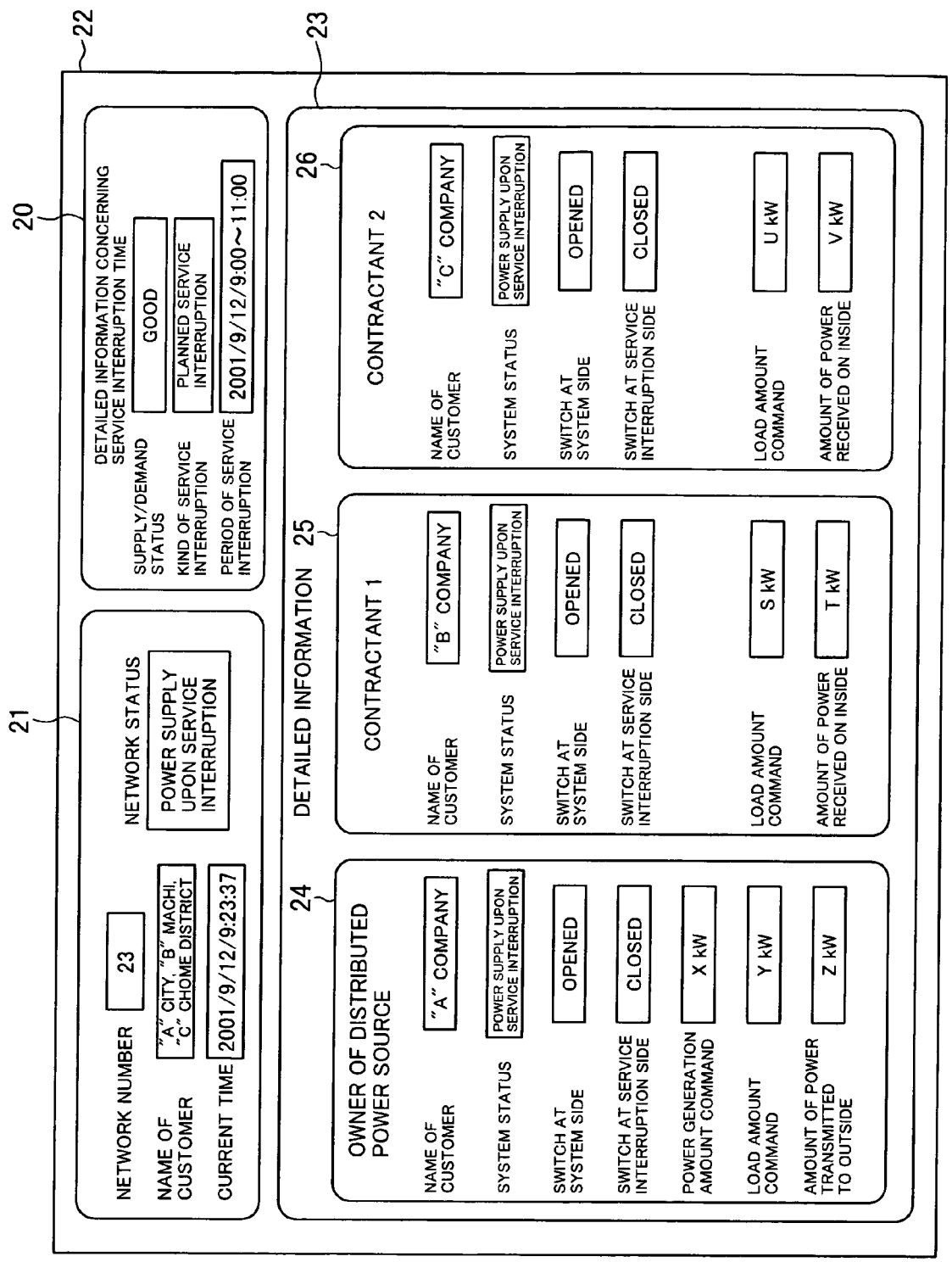
FIG. 5 shows an example of a display screen outputting a status of the power supply system with the distributed power source.

FIG. 5 shows an example of an output screen indicating the present states of a local power supply network that are to be outputted to the information terminal 56 of the owner 51 of distributed power source, the information terminal 57 of the contractant A of power supply upon service interruption, and the information terminal 58 of the power supplier B upon service interruption, which are shown in FIG. 15.

In FIG. 5, an output screen 22 of the information terminal includes a basic information output section 21 associated with a local power supply network, a detailed information output section 20 concerning service interruption time, and a detailed information output section 23 associated with contract customers (refer to owners of distributed power source and contractants of power upon service interruption).

In the basic information output section 21, the number of an assigned power supply network, a name, time information, and a status of the power supply network are outputted. In the column concerning the status of power supply network, it is outputted whether the power supply network is in a normal state (not a service interruption state but a state where power is being supplied from an electric utility), or in a power supply state upon service interruption.

In the output section 20 of detailed information concerning service interruption time, information concerning service interruption time, such as a power supply/demand state within the local power supply network, the kind of a service interruption in the process of occurring, and the time period of the service interruption, are outputted.

The detailed information output section 23 associated with contract customers (refer to owners of distributed power source and contractants of power upon service interruption) comprises a detailed information output section 24 associated with owners of distributed power source, and detailed information output sections 25 and 26 associated with contractants of power upon service interruption. In the detailed information output section 24 associated with owners of distributed power source, outputted are the names of the owners, statuses of local power networks, statuses of switches, the power generation amount commands with respect to distributed power sources, load amount commands, and power amount being supplied to the outside. In the detailed information output sections 25 and 26 associated with contractants of power upon service interruption, outputted are the names of contractants, statuses of local power networks, statuses of switches, load amount commands, and the amounts of power received on the inside.

According to the output screen as in FIG. 5, the owners of distributed power source and contractants of power upon service interruption can know the status of local power network in real time.

Figure 6:
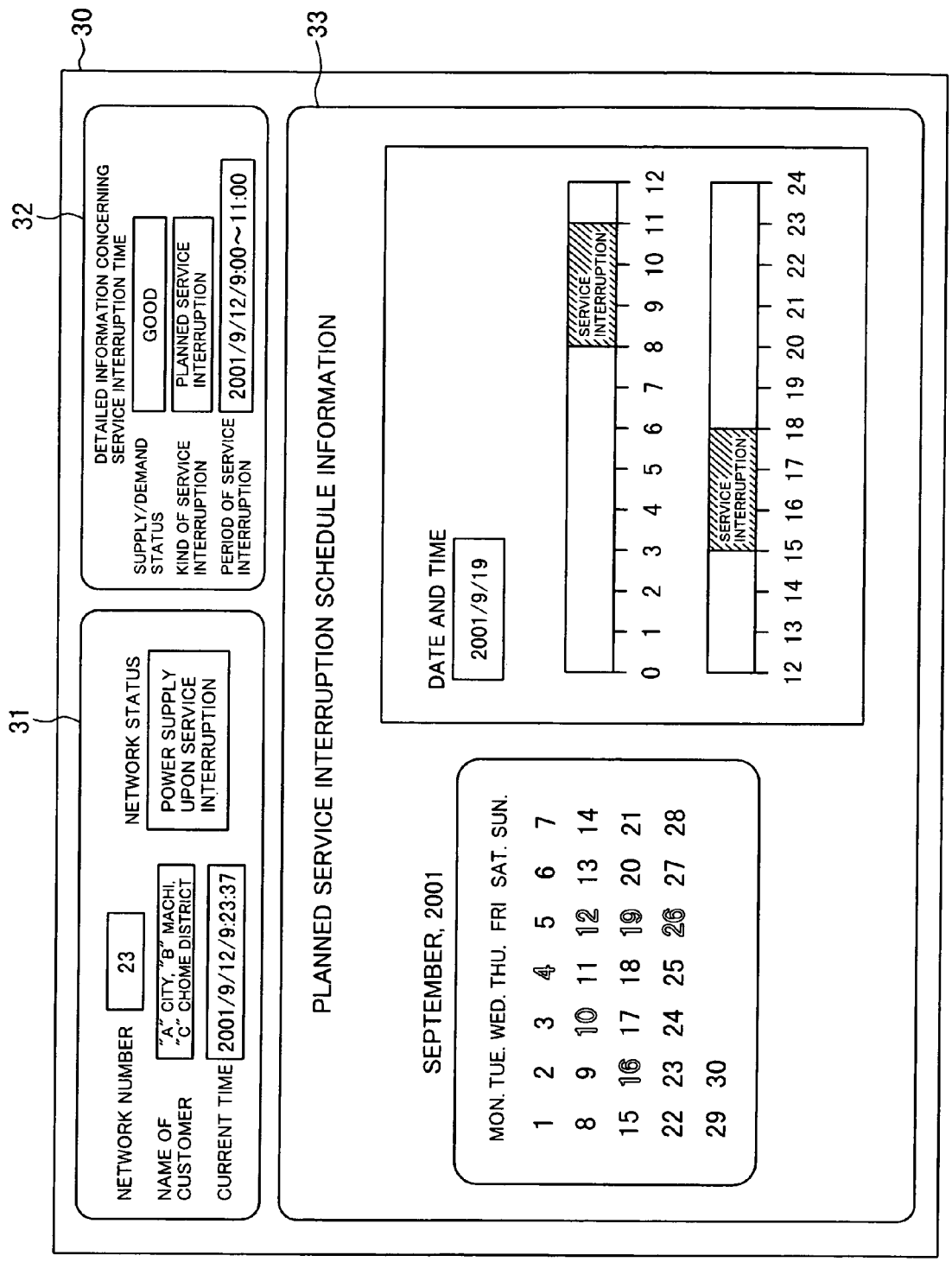
FIG. 6 shows an example of a display screen outputting service interruption advance-notice information.

FIG. 6 shows an example of an output screen associated with planned service interruption schedule information that is to be outputted to the information terminal 56 of the owner of distributed power source 51, the information terminal 57 of the contractant A of power supply upon service interruption, and the information terminal 58 of the contractant B of power supply upon service interruption, which are shown in FIG. 15.

In FIG. 6, an output screen 30 associated with planned service interruption schedule information comprises a basic information output section 31 (same as 21 in FIG. 5) associated with local power supply networks, a detailed information output section 32 (same as 20 in FIG. 5) concerning service interruption time, and planned service interruption information output section 33. In the planned service interruption information output section 33, outputted are a calendar of one month in which scheduled days when planned service interruptions occur are indicated (in FIG. 6, planned service interruption scheduled days are represented by hollow figures), and the time periods of the days when the planned service interruptions occur.

Thereby, both of the owners of distributed power source and the contractants of power upon service interruption can make sure in advance when planned service interruptions occur. During service interruption, in order to keep a power supply/demand balance within the local power supply network, the load amount is basically reduced. Hence, it follows that, during service interruption, there exist facilities that are unable to operate (or facilities that decrease in operational capability). It is therefore desirable for contractants of power upon service interruption to know in advance when such situations are encountered.

Figure 2:
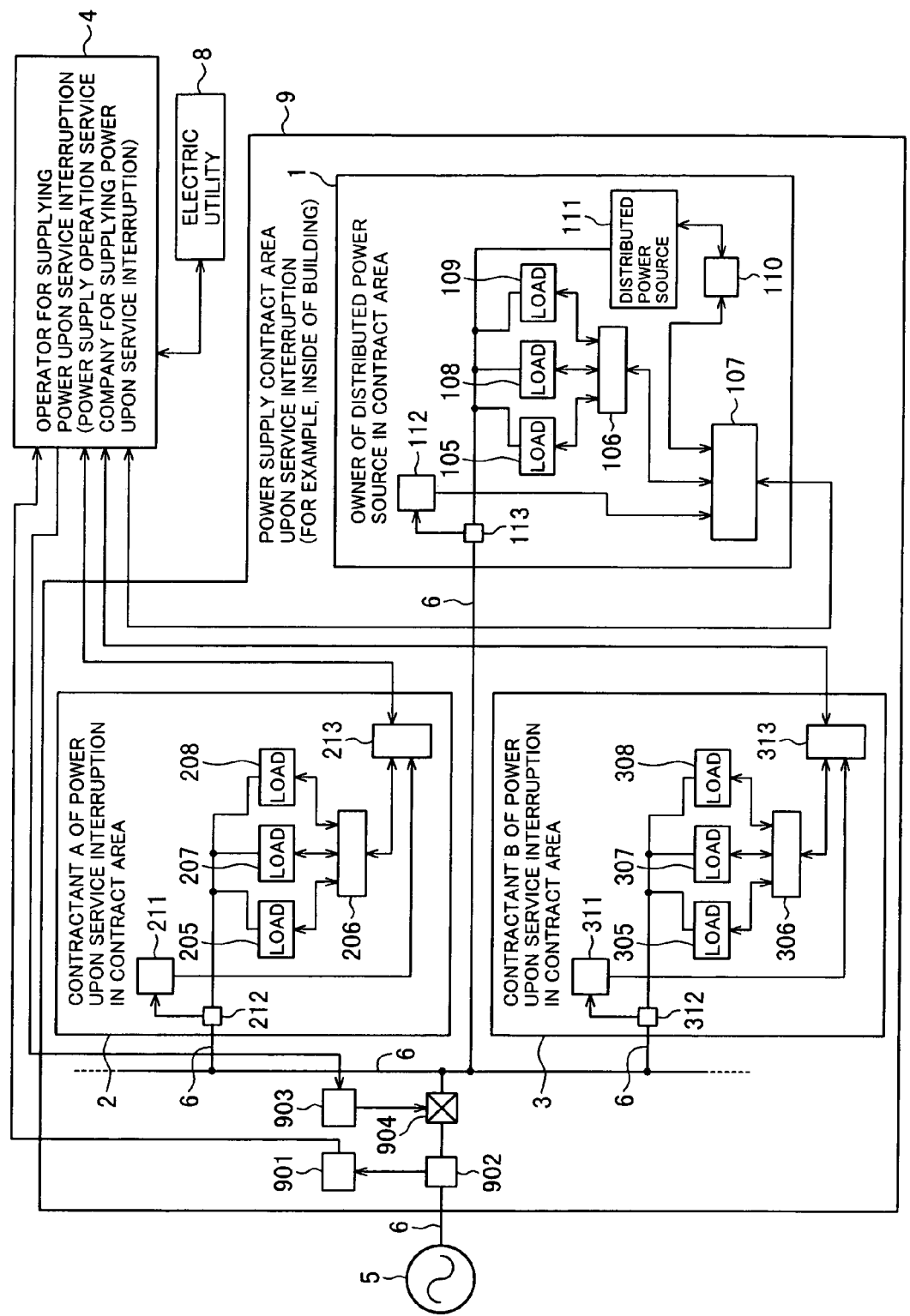
FIG. 2 shows another embodiment of the present invention.

FIG. 2 shows an embodiment different from that shown in FIG. 1. Its difference from the embodiment in FIG. 1 is that power supply is conducted using the same power line at normal times (i.e., in a state of being supplied with power from an electric utility) and at the time of service interruption. Specifically, in the example in FIG. 1, the power line (6 in FIG. 1) used at normal times and the power line (6 in FIG. 1) used at the time of service interruption were different form each other, while in the example in FIG. 2, the same power line (6 in FIG. 2) is used in common for normal times and for the time of service interruption. As in a building such as a tenant building, this embodiment is suitable to such a case where a contract area of power supply upon service interruption (contract area 9 of power supply upon service interruption in FIG. 1) and another outside area can be separated by disconnecting some point of the power network. In this embodiment, the opening of a switch 904 enables the outside area (a power system of an electric utility) and the contract area 9 of power supply upon service interruption to be separated.

In the embodiment in FIG. 2, the power line is used in common for normal times and for the time of service interruption. The switch 904 and a switch controller 903 are collectively placed at the basal portion of the local power network. Also, a voltage sensor 902 for detecting the occurrence of a service interruption, and a service interruption determining device 901 are collectively placed at the basal portion of the local power network, as well.

The flow of the operations of the embodiment in FIG. 2 is the same as that of the embodiment in FIG. 1. At normal times, the switch 904 is closed, and is being supplied with power from the power system 5. At the time of a planned service interruption or an unplanned service interruption, the switch 904 is opened by the switch controller 903. As a result, the area 9 of power supply upon service interruption constitutes a local power network where the area 9 of power supply upon service interruption is closed, and is supplied with power from the distributed power source 111.

Since the embodiment shown in FIG. 2 needs not to newly install a power line for the time of service interruption, it reduces the facility cost and facility work, and shortens the time required before the start of service. Also, this embodiment is not subjected to constrains of power line installation place. Furthermore, for changeover to a local power network upon occurrence of service interruption, it suffices only to open the switch 904. As a result, the changeover is quickly done, thereby allowing the impact of service interruption to be reduced to a lesser extent.

As described above, according to the present invention, upon service interruption, it is possible to use the distributed power source and stably supply power to the loads.

The invention claimed is:

1. A power supply system comprising:

a first switch for normally connecting a plurality of loads with a power system at normal times and disconnecting them upon interruption of electric service, the plurality of loads being normally supplied with power from the power system at the normal times and supplied with power from a distributed power source upon the interruption of the electric service from the power system;

a second switch for connecting the plurality of loads with the distributed power source upon the interruption of the electric service;

output power value detecting means for detecting the output power in the distributed power source;

total load power value detecting means for detecting the total load power in the plurality of loads; and a command device for issuing a command signal for shutting off the loads that have been predetermined among the plurality of loads or reducing the power consumption of the loads which have been predetermined among the plurality of loads so that the total load power value in the plurality of loads is close to the output power value in the distributed power source, before the interruption of the electric service begins in the case where a time at which a service interruption is going to take place is provided in advance, and next issuing a command signal for turning on said second switch, and then issuing a command signal for turning off said first switch, and successively comparing the output power value in the distributed power source detected by said output power value detecting means and the total load power value in the plurality of loads detected by said total load power value detecting means during the interruption of the electric service from the power system, and then issuing a command signal for shutting off the loads in ascending order of influence of their being shut off or reducing the power consumption of the loads in ascending order of influence of their being reduced until the total load power value in the plurality of loads close to the output power value in the distributed power source, in the case where the total load power value in the plurality of loads detected by said total load power value detecting means is larger than the output power value in the distributed power source detected by said output power value detecting means; and a control unit controlled by the command signals from said command device, and shutting off the loads that have been predetermined among the plurality of loads or reducing the power consumption of the loads which have been predetermined among the plurality of loads, before the interruption of the electric service, and shutting off the loads in ascending order of influence of their being shut off or reducing the power consumption of the loads in ascending order of influence of their being reduced until the total load power value in the plurality of loads close to the output power value in the distributed power source, during the interruption of the electric service form the power system.

2. A method for supplying power upon interruption of electric service, the method comprising:

a first step of shutting off loads which have been predetermined among a plurality of loads or reducing the power consumption of loads which have been predetermined among the plurality of loads so that the total load power value in the plurality of loads close to the output power value in a distributed power source, before the interruption of the electric service begins in the case where a time at which a service interruption is going to take place is provided in advance, the plurality of loads being normally supplied with power from a power system and supplied with power from the distributed power source upon interruption of electric service;

a second step of connecting the plurality of loads with the distributed power source and starting to supply power from the distributed power source to the plurality of loads;

a third step of disconnecting the plurality of loads with the power system; and a fourth step of detecting the total load power in the plurality of loads and the output power in the distributed power source, and successively comparing the detected value of the total load power and the detected value of the output power during the interruption of the electric service from the power system, and shutting off the loads in ascending order of influence of their being shut off or reducing the power consumption of the loads in ascending order of influence of their being reduced until the detected value of the total load power close to the detected value of the output power in the case where the detected value of the total load power is larger than the detected value of the output power.

* * * * *